United States Patent
Dai

(10) Patent No.: US 10,345,555 B2
(45) Date of Patent: Jul. 9, 2019

(54) CAMERA LENS

(71) Applicant: ZHEJIANG SUNNY OPTICS CO., LTD., Ningbo (CN)

(72) Inventor: Fujian Dai, Ningbo (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 11 days.

(21) Appl. No.: 15/552,230

(22) PCT Filed: Aug. 15, 2016

(86) PCT No.: PCT/CN2016/095334
§ 371 (c)(1),
(2) Date: Aug. 18, 2017

(87) PCT Pub. No.: WO2018/010246
PCT Pub. Date: Jan. 18, 2018

(65) Prior Publication Data
US 2018/0239113 A1 Aug. 23, 2018

(30) Foreign Application Priority Data
Jul. 12, 2016 (CN) .......................... 2016 1 0551455

(51) Int. Cl.
G02B 13/00 (2006.01)
G02B 9/62 (2006.01)
G02B 27/00 (2006.01)

(52) U.S. Cl.
CPC ........... *G02B 13/0045* (2013.01); *G02B 9/62* (2013.01); *G02B 27/0025* (2013.01)

(58) Field of Classification Search
CPC .............. G02B 13/001; G02B 13/0015; G02B 13/002; G02B 13/0045; G02B 13/06;
(Continued)

(56) References Cited

U.S. PATENT DOCUMENTS 9,557,534 B1 * 1/2017 Liao .................... G02B 13/0045
2014/0247507 A1 * 9/2014 Tsai ......................... G02B 9/62
359/713

(Continued)

FOREIGN PATENT DOCUMENTS

| CN | 205003346 U | 1/2016 |
|---|---|---|
| CN | 205049802 U | 2/2016 |
| CN | 106019535 A | 10/2016 |

OTHER PUBLICATIONS

International Search Report issued in PCT/CN2016/095334, dated Feb. 28, 2017 (15 pages).

(Continued)

*Primary Examiner* — Marin Pichler
(74) *Attorney, Agent, or Firm* — Osha Liang LLP

(57) ABSTRACT

A camera lens is provided. The camera lens includes, in sequence from an object side to an image side: a first lens having a negative refractive power; a second lens having a positive refractive power, an image-side surface of the second lens being configured as a convex surface and material of the second lens being glass; a third lens having a positive refractive power; a fourth lens having a negative refractive power; a fifth lens having a positive refractive power; and a sixth lens having a negative refractive power, an object-side surface of the sixth lens being configured as a convex surface and an image-side surface of the sixth lens being configured as a concave surface.

10 Claims, 18 Drawing Sheets

(58) Field of Classification Search
CPC . G02B 13/18; G02B 3/02; G02B 9/00; G02B 9/62; G02B 9/64; G02B 27/00; G02B 27/0025
USPC .................................. 359/761, 756, 754, 755
See application file for complete search history.

(56) References Cited

U.S. PATENT DOCUMENTS

| | | |
|---|---|---|
| 2015/0116572 A1 | 4/2015 | Liao |
| 2015/0116573 A1 | 4/2015 | Liao |
| 2016/0147044 A1 | 5/2016 | Kondo |
| 2017/0108666 A1* | 4/2017 | Lee .......................... G02B 9/62 |

OTHER PUBLICATIONS

Written Opinion of the International Searching Authority issued in PCT/CN2016/095334, dated Feb. 28, 2017 (4 pages).

\* cited by examiner

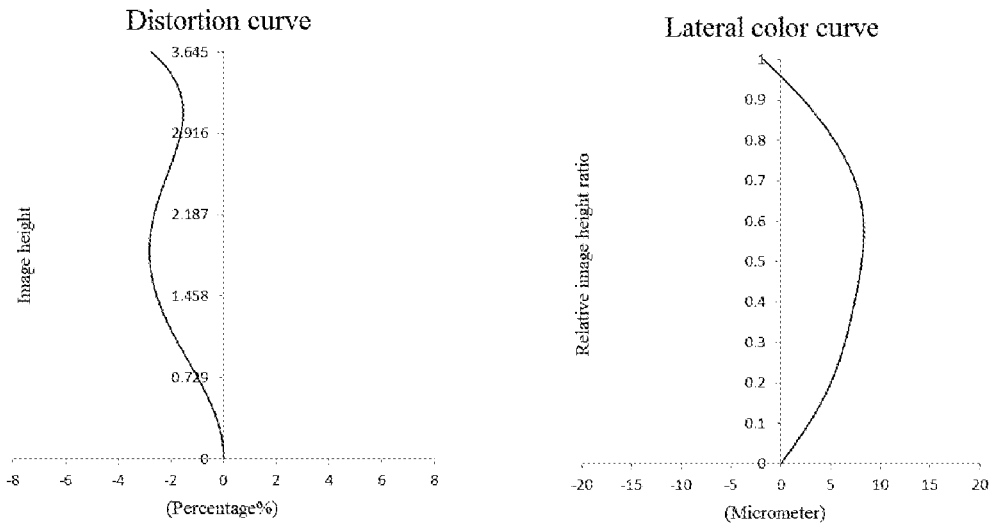
Fig. 24                                  Fig. 25
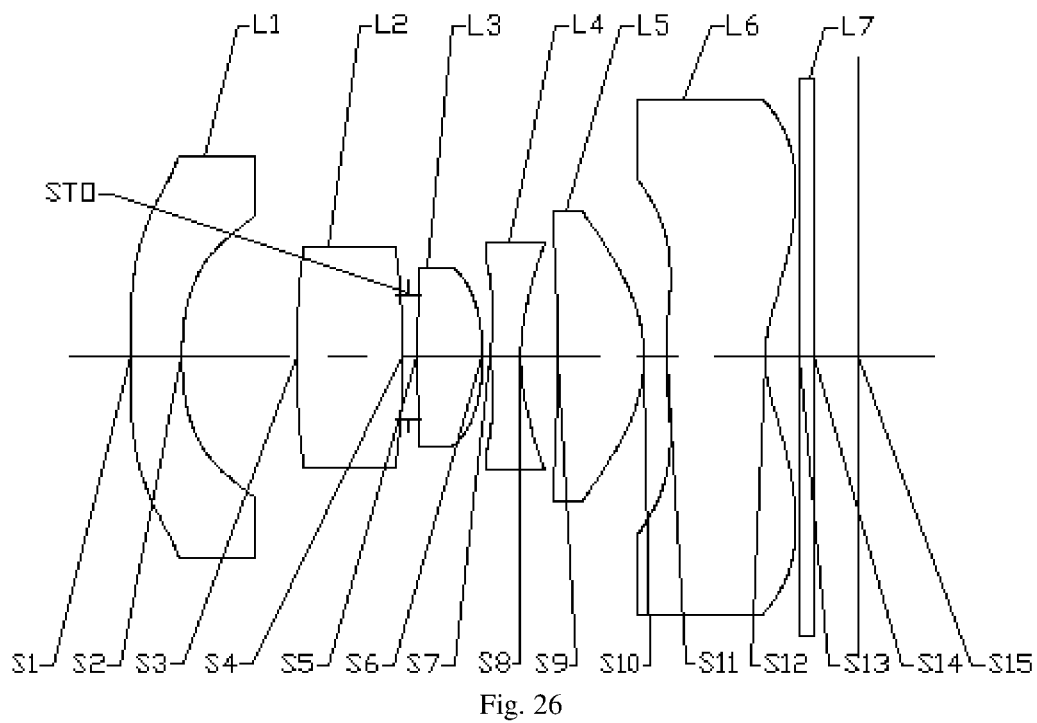
Fig. 26

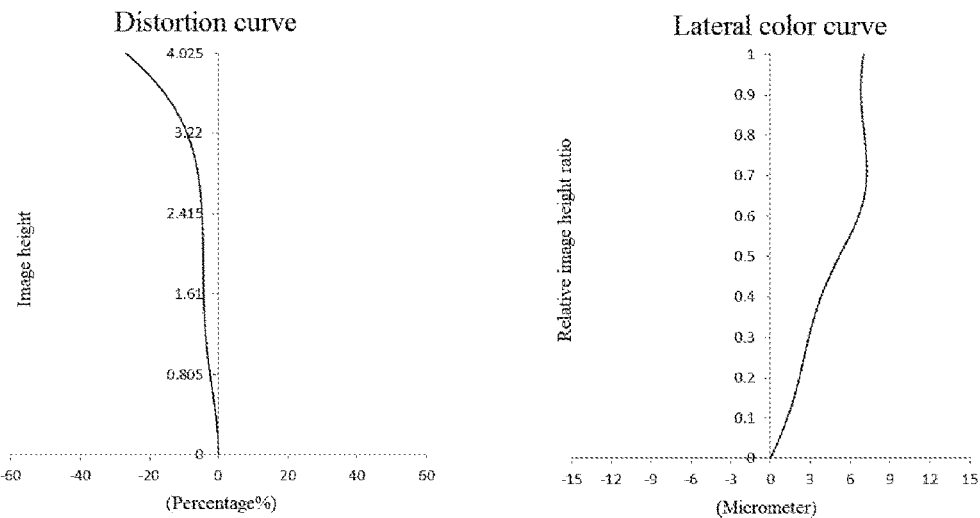
Fig. 44
Fig. 45
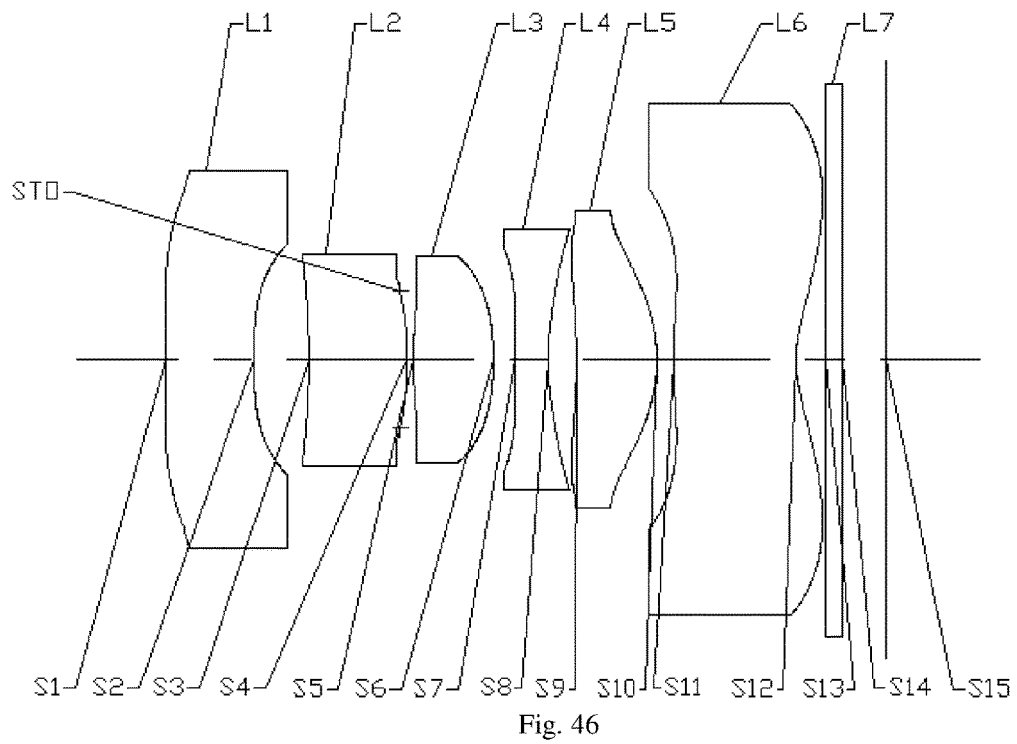
Fig. 46

CAMERA LENS

CROSS-REFERENCE TO RELATED APPLICATIONS

The present application is a U.S. National Phase application under 35 USC § 371 of the International Patent Application No. PCT/CN2016/095334, filed on Aug. 15, 2016, which claims the benefit of prior Chinese Application No. 201610551455.1, filed with the State Intellectual Property Office of P. R. China on Jul. 12, 2016. The entire contents of the before-mentioned patent applications are incorporated by reference as part of the disclosure of this U.S. application.

FIELD

The present disclosure relates to a field of optical imaging, and more particularly to a camera lens.

BACKGROUND

With developments of science and technology, portable electronic products are rising gradually, and especially the portable electronic product with a camera function is more popular with people. A photosensitive element in an optical imaging system includes a charge coupled device (CCD) or a complementary metal oxide semiconductor (CMOS). With the development of semiconductor process technology, a pixel size of the photosensitive element is reduced, and the optical imaging system tends to have a higher resolution and a higher imaging quality. To satisfy this tendency, a camera lens applied to the portable electric product is further required to be miniaturized and to have a high imaging quality and a wide angle.

A mainstream current camera lens generally includes five lenses, which cannot satisfy the requirement of higher imaging quality, and therefore it is necessary to increase the number of the lens certainly. However, the increased number of the lens is not beneficial for the miniaturization of the camera lens, and hence the cost may be increased correspondingly.

SUMMARY

Embodiments of the present disclosure seek to solve at least one of problems existing in the related art to at least some extent. For that reason, a camera lens is provided by the present disclosure.

The camera lens according to embodiments of the present disclosure, in sequence from an object side to an image side, includes:

a first lens having a negative refractive power;

a second lens having a positive refractive power, an image-side surface of the second lens being configured as a convex surface and material of the second lens being glass;

a third lens having a positive refractive power, an image-side surface of the third lens being configured as a convex surface;

a fourth lens having a negative refractive power;

a fifth lens having a positive refractive power; and a sixth lens having a negative refractive power, an object-side surface of the sixth lens being configured as a convex surface and an image-side surface of the sixth lens being configured as a concave surface, wherein the camera lens satisfies a conditional expression:

$-1.7 < f2/f4 < -0.7$, in which f2 denotes an effective focal length of the second lens; f4 denotes an effective focal length of the fourth lens.

In some embodiments, the camera lens satisfies a conditional expression:

$1 < f2/f < 3$, in which, f2 denotes the effective focal length of the second lens; f denotes an effective focal length of the camera lens.

In some embodiments, the camera lens satisfies a conditional expression:

$0.3 < CT1/CT2 < 0.9$, in which CT1 denotes a center thickness of the first lens in an optical axis; CT2 denotes a center thickness of the second lens in the optical axis.

In some embodiments, the camera lens satisfies a conditional expression:

$0.03 < SAG11/TTL < 0.08$, in which SAG11 denotes an axial distance from an intersection point of an object-side surface of the first lens with an optical axis to a vertex of an effective radius of the object-side surface of the first lens; TTL denotes an axial distance from the object-side surface of the first lens to an imaging surface.

In some embodiments, the camera lens further satisfies a conditional expression:

$0.05 < SAG12/TTL < 0.1$, in which SAG12 denotes an axial distance from an intersection point of an image-side surface of the first lens with an optical axis to a vertex of an effective radius of the image-side surface of the first lens; TTL denotes an axial distance from an object-side surface of the first lens to an imaging surface.

In some embodiments, an image-side surface of the fifth lens is configured as a convex surface.

In some embodiments, the camera lens further satisfies a conditional expression:

$0.5 < DT11/DT62 < 1$, in which DT11 denotes an effective radius of an object-side surface of the first lens; DT62 denotes an effective radius of the image-side of the sixth lens.

In some embodiments, the camera lens further satisfies a conditional expression:

$1.1 < DT11/DT52 < 1.5$, in which DT11 denotes an effective radius of an object-side surface of the first lens; DT52 denotes an effective radius of an image-side surface of the fifth lens.

In some embodiments, the camera lens further satisfies a conditional expression:

$1 < ImgH/f < 1.5$, in which ImgH denotes a half of a diagonal line of an effective pixel area in an imaging surface; f denotes an effective focal length of the camera lens.

In some embodiments, an image-side surface of the first lens is configured as a concave surface.

The camera lens according to embodiments of the present disclosure is miniaturized and has a wide angle and a high imaging quality.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and readily appreciated from descriptions made with reference to following drawings, in which:

FIG. 24 is a diagram showing a distortion curve (%) of the camera lens in embodiment 5;

FIG. 25 is a diagram showing a lateral color curve (μm) of the camera lens in embodiment 5;

FIG. 26 is a schematic view of a camera lens according to embodiment 6;

FIG. 44 is a diagram showing a distortion curve (%) of the camera lens in embodiment 9;

FIG. 45 is a diagram showing a lateral color curve (μm) of the camera lens in embodiment 9;

FIG. 46 is a diagram showing a schematic view of a camera lens in embodiment 10;

DETAILED DESCRIPTION

Figure 1:
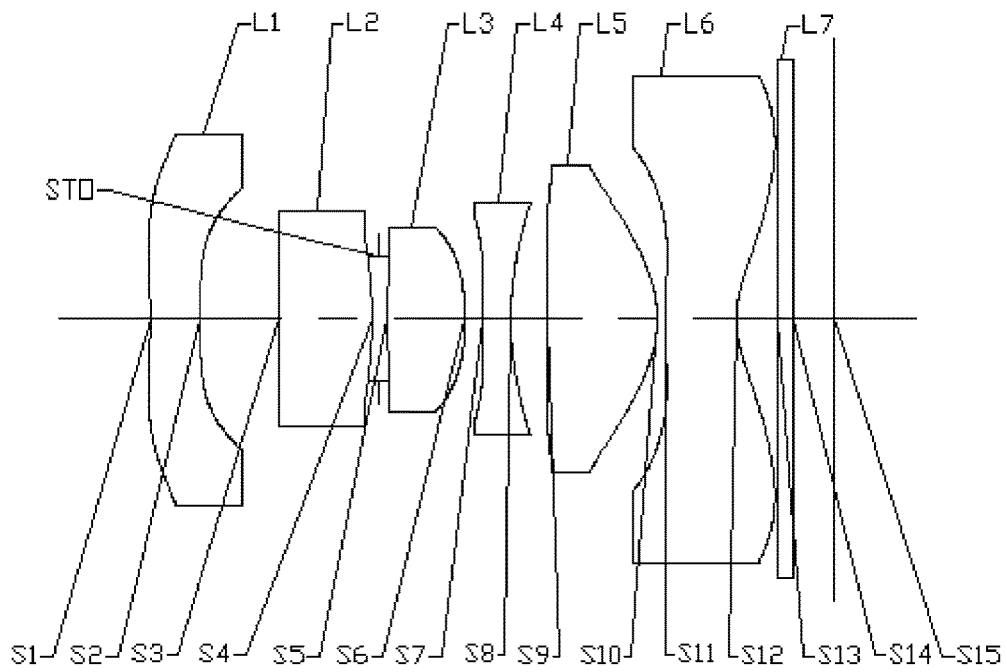
FIG. 1 is a schematic view of a camera lens according to embodiment 1.
Figure 2:
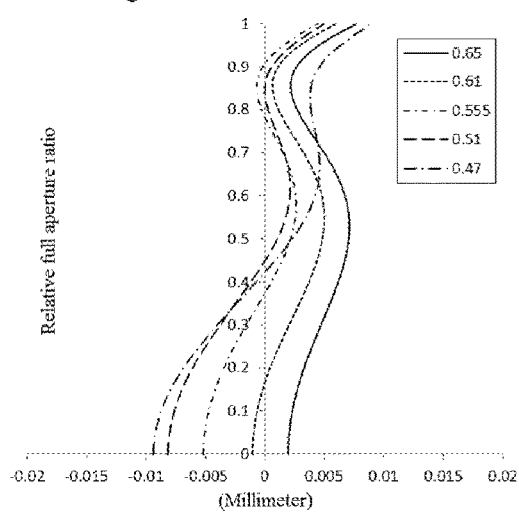
FIG. 2 is diagram showing a longitudinal aberration curve (mm) of the camera lens in embodiment 1.
Figure 3:
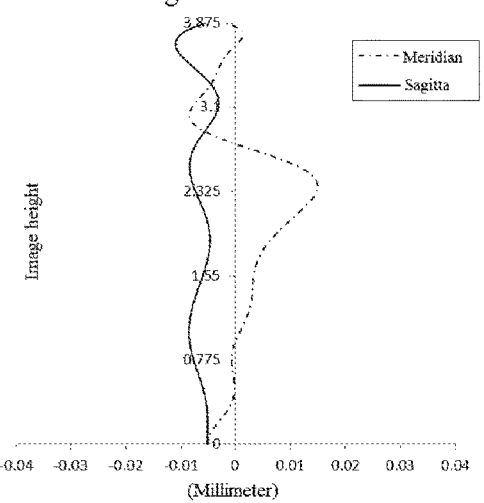
FIG. 3 is a diagram showing an astigmatism curve (mm) of the camera lens in embodiment 1.
Figure 4:
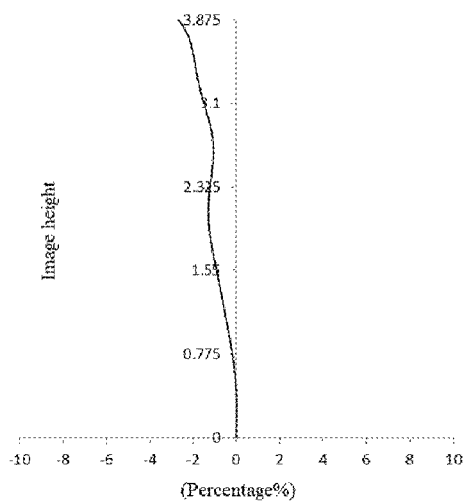
FIG. 4 is a diagram showing a distortion curve (%) of the camera lens in embodiment 1.
Figure 5:
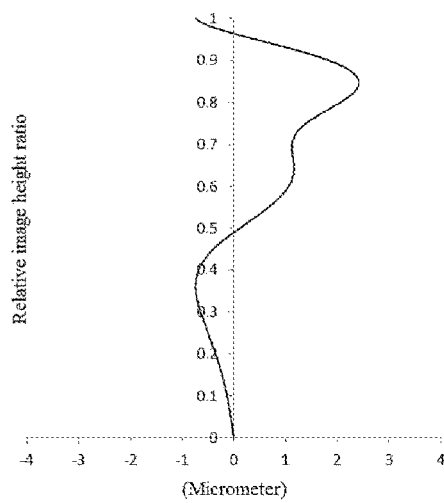
FIG. 5 is a diagram showing a lateral color curve (μm) of the camera lens in embodiment 1.
Figure 6:
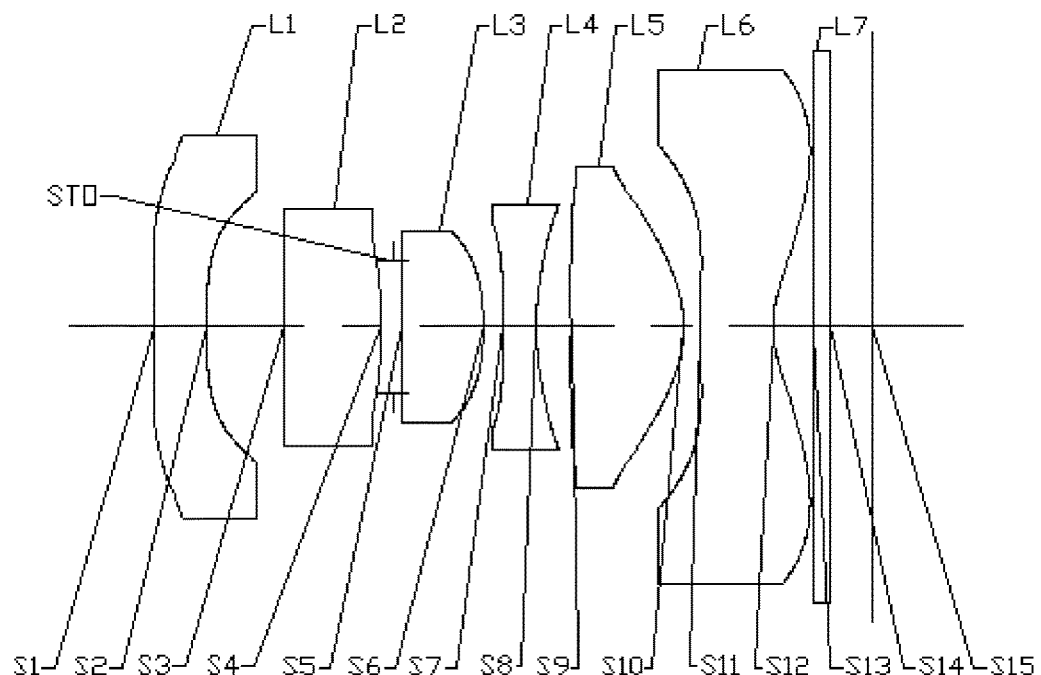
FIG. 6 is a schematic view of a camera lens according to embodiment 2.
Figure 7:
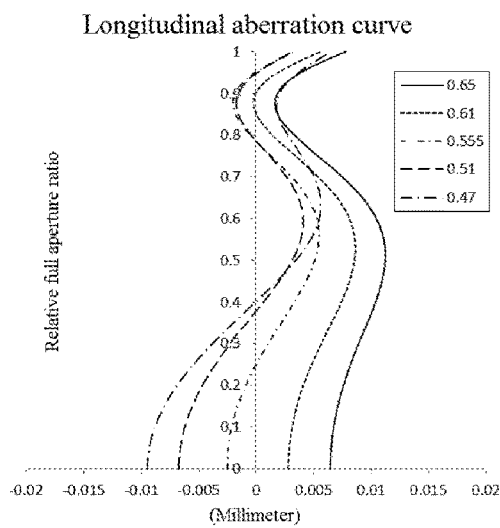
FIG. 7 is a diagram showing a longitudinal aberration curve (mm) of the camera lens in embodiment 2.
Figure 8:
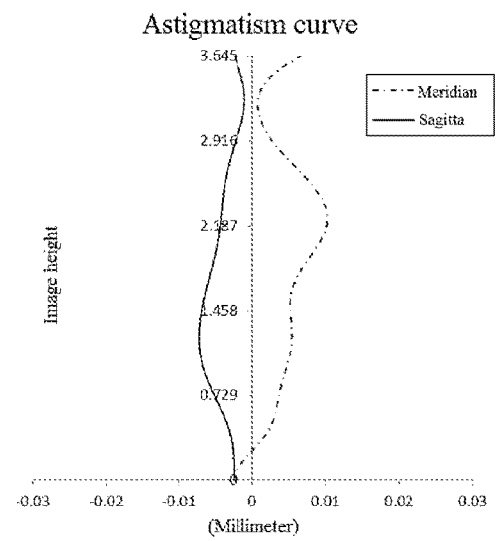
FIG. 8 is a diagram showing an astigmatism curve (mm) of the camera lens in embodiment 2.
Figure 9:
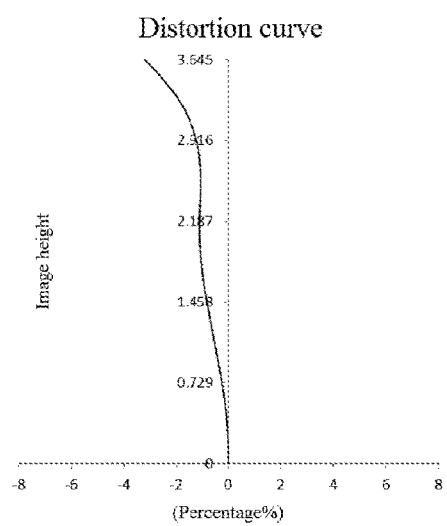
FIG. 9 is a diagram showing a distortion curve (%) of the camera lens in embodiment 2.
Figure 10:
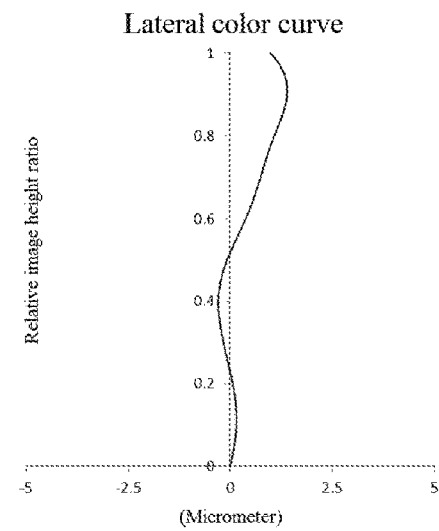
FIG. 10 is a diagram showing a lateral color curve (μm) of the camera lens in embodiment 2.
Figure 11:
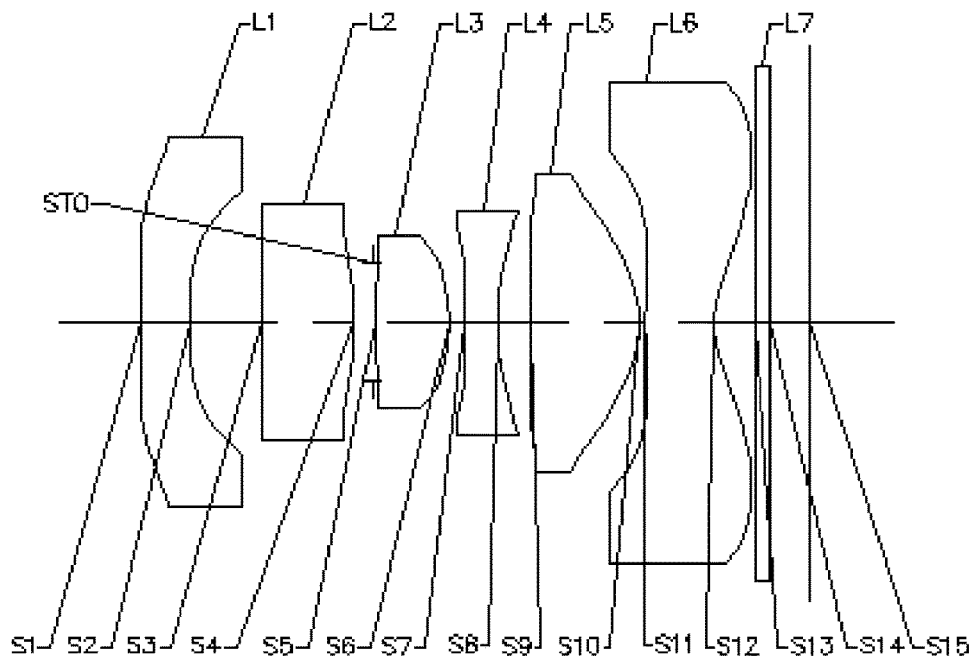
FIG. 11 is a schematic view of a camera lens according to embodiment 3.
Figure 12:
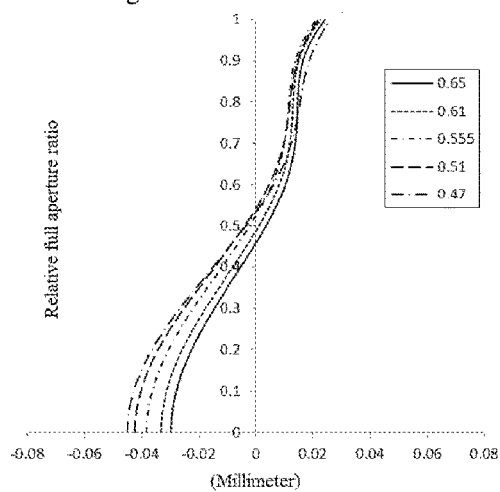
FIG. 12 is a diagram showing a longitudinal aberration curve (mm) of the camera lens in embodiment 3.
Figure 13:
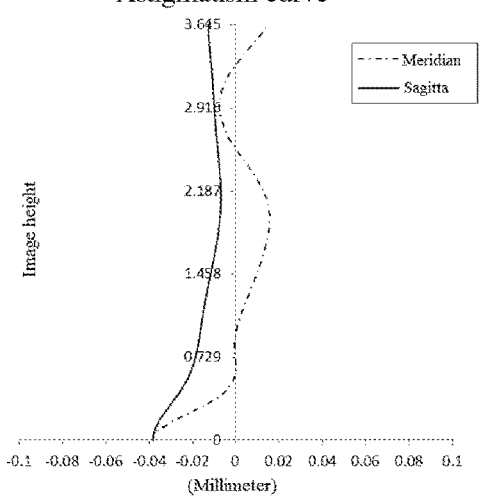
FIG. 13 is a diagram showing an astigmatism curve (mm) of the camera lens in embodiment 3.
Figure 14:
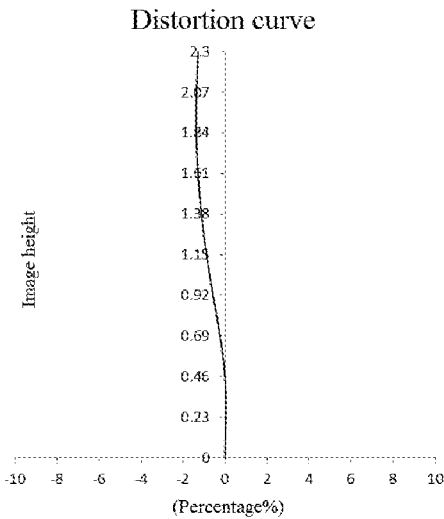
FIG. 14 is a diagram showing a distortion curve (%) of the camera lens in embodiment 3.
Figure 15:
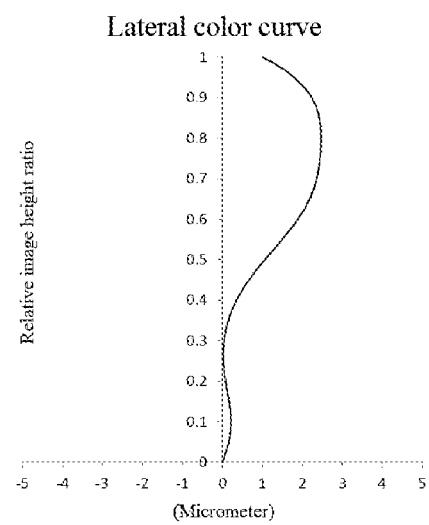
FIG. 15 is a diagram showing a lateral color curve (μm) of the camera lens in embodiment 3.
Figure 16:
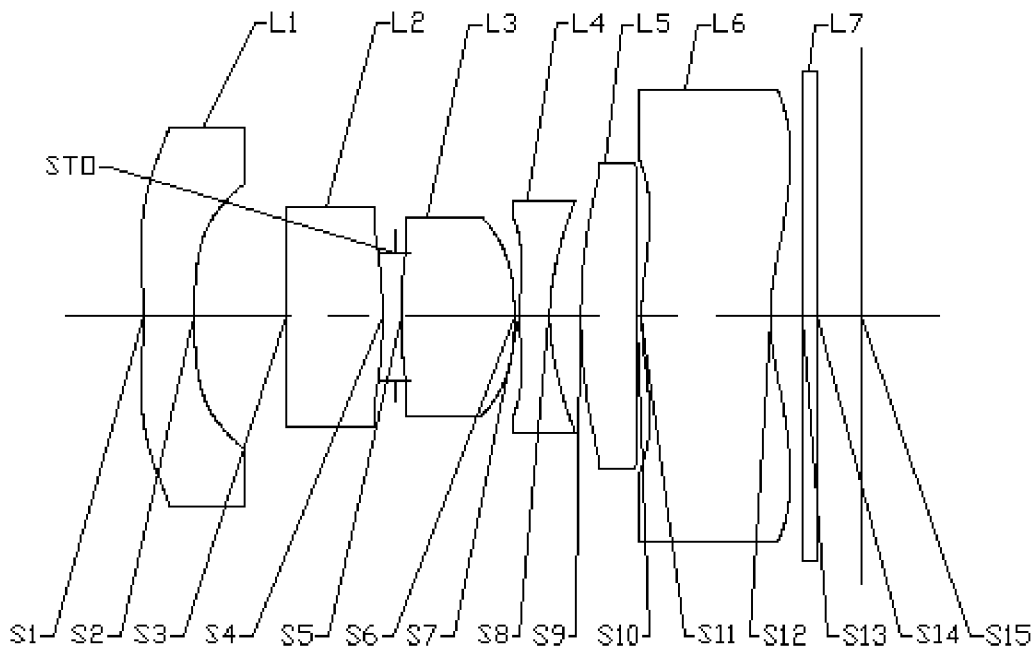
FIG. 16 is a schematic view of a camera lens according to embodiment 4.
Figure 17:
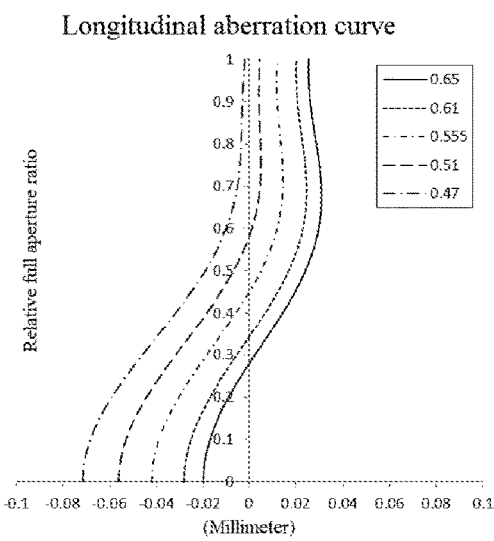
FIG. 17 is a diagram showing a longitudinal aberration curve (mm) of the camera lens in embodiment 4.
Figure 18:
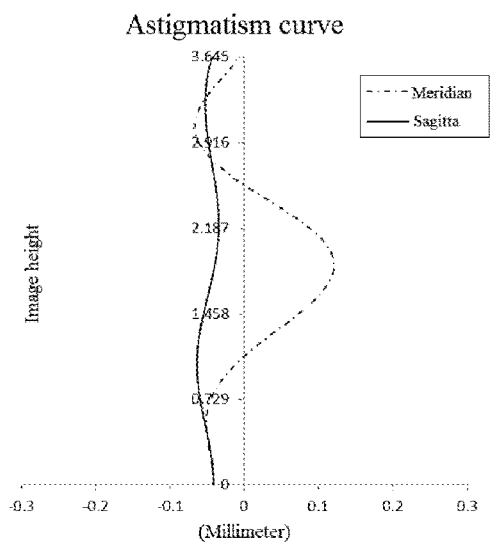
FIG. 18 is a diagram showing an astigmatism curve (mm) of the camera lens in embodiment 4.
Figure 19:
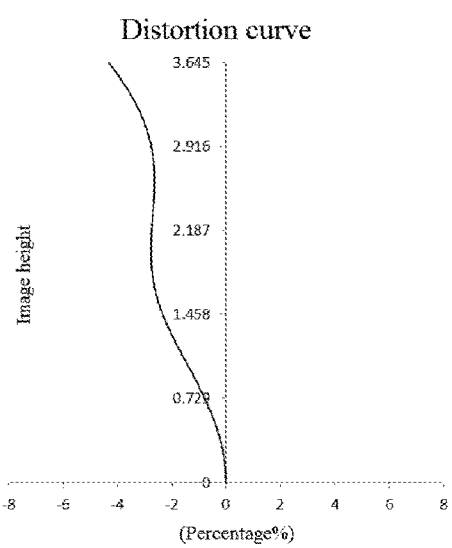
FIG. 19 is a diagram showing a distortion curve (%) of the camera lens in embodiment 4.
Figure 20:
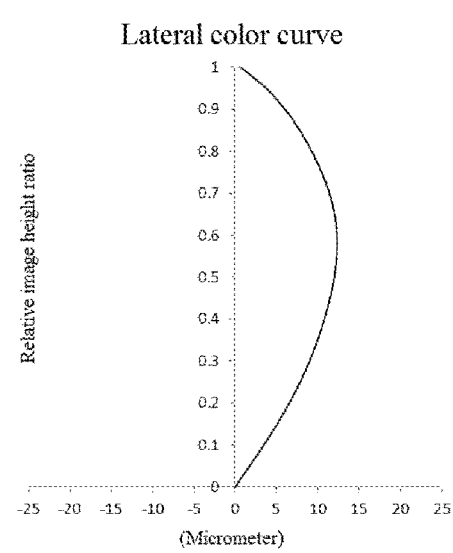
FIG. 20 is a diagram showing a lateral color curve (μm) of the camera lens in embodiment 4.
Figure 21:
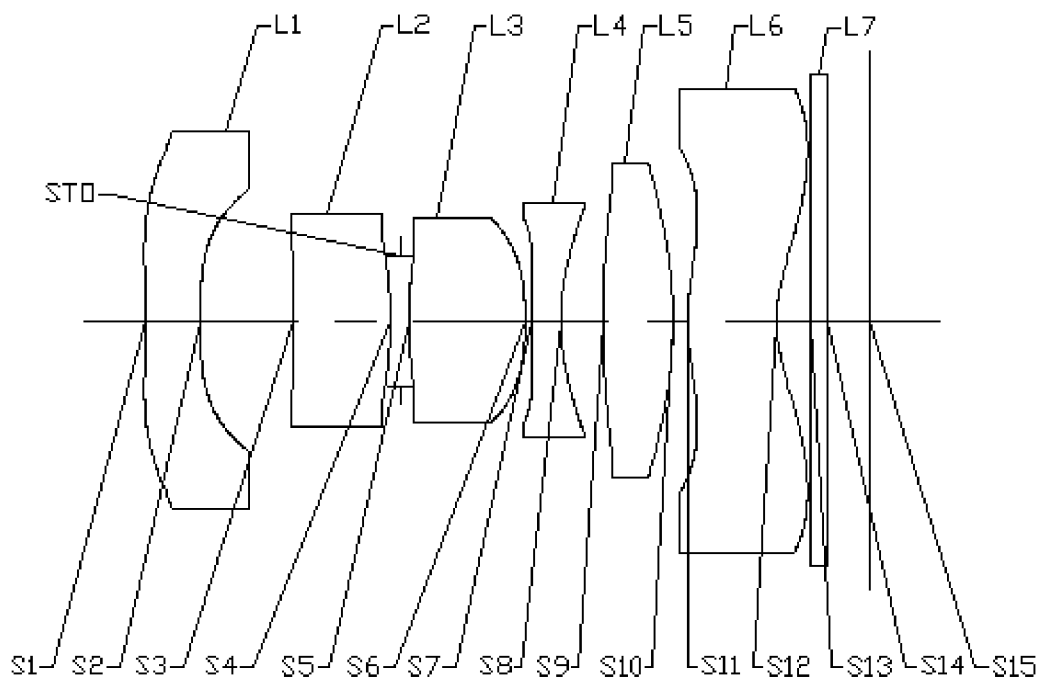
FIG. 21 is a schematic view of a camera lens according to embodiment 5.
Figure 22:
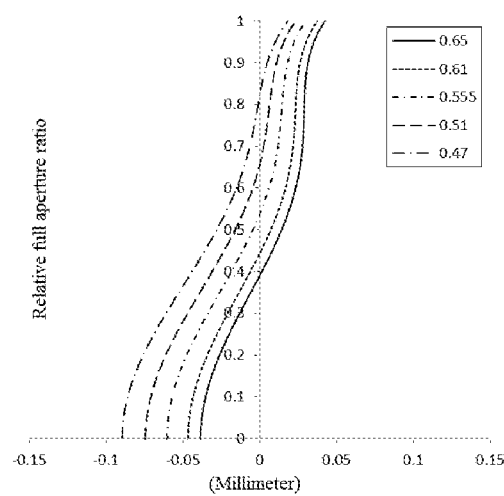
FIG. 22 is a diagram showing a longitudinal aberration curve (mm) of the camera lens in embodiment 5.
Figure 23:
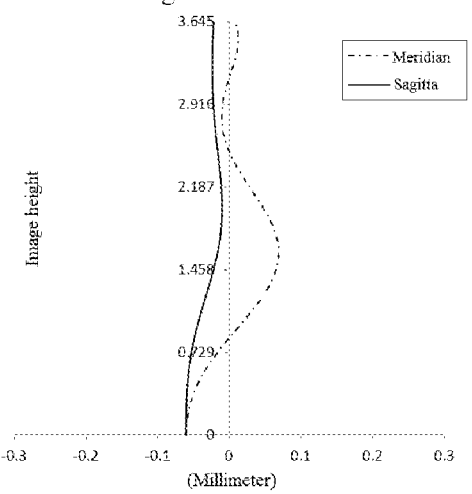
FIG. 23 is a diagram showing an astigmatism curve (mm) of the camera lens in embodiment 5.
Figure 27:
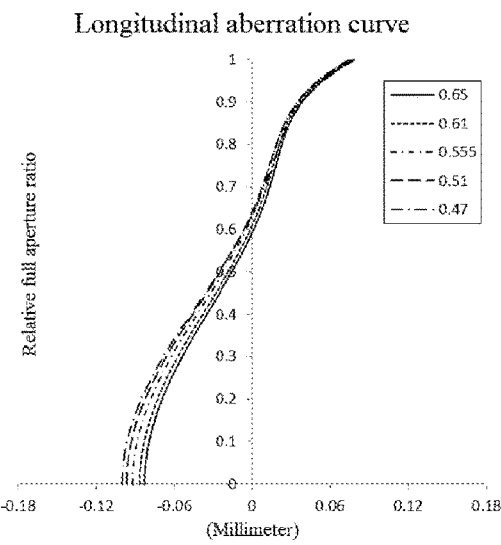
FIG. 27 is a diagram showing a longitudinal aberration curve (mm) of the camera lens in embodiment 6.
Figure 28:
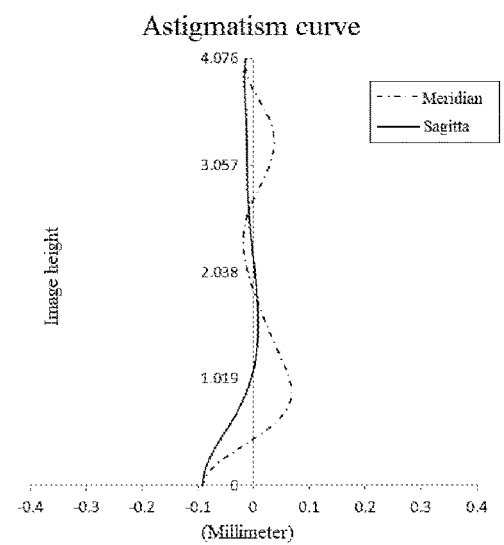
FIG. 28 is a diagram showing an astigmatism curve (mm) of the camera lens in embodiment 6.
Figure 29:
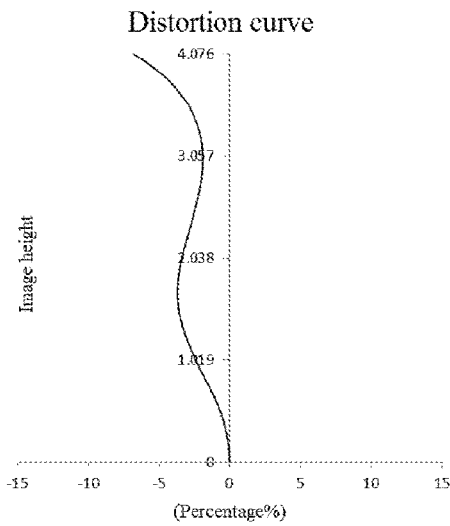
FIG. 29 is a diagram showing a distortion curve (%) of the camera lens in embodiment 6.
Figure 30:
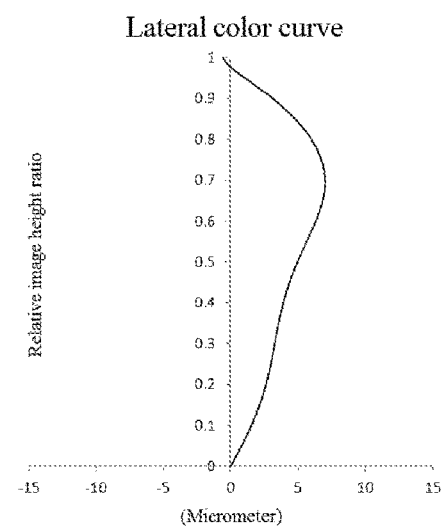
FIG. 30 is a diagram showing a lateral color curve (μm) of the camera lens in embodiment 6.
Figure 31:
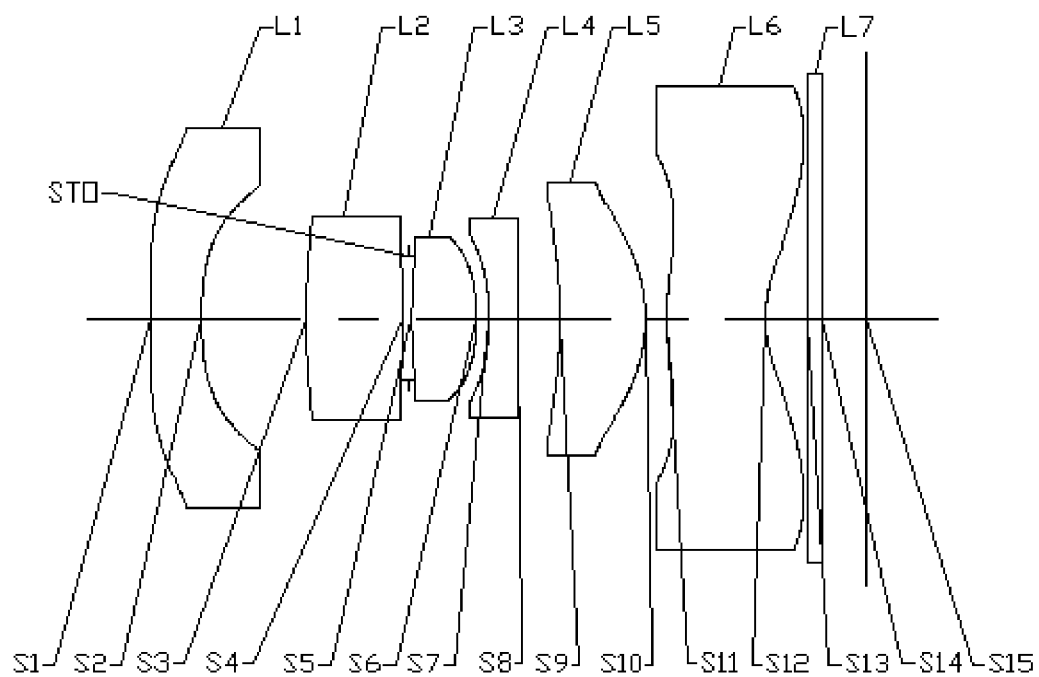
FIG. 31 is a schematic view of a camera lens according to embodiment 7.
Figure 32:
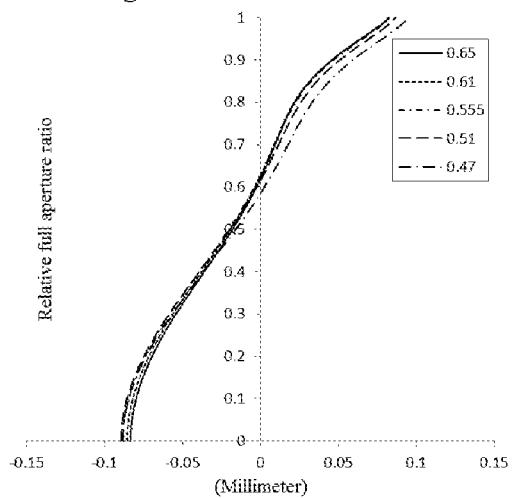
FIG. 32 is a diagram showing a longitudinal aberration curve (mm) of the camera lens in embodiment 7.
Figure 33:
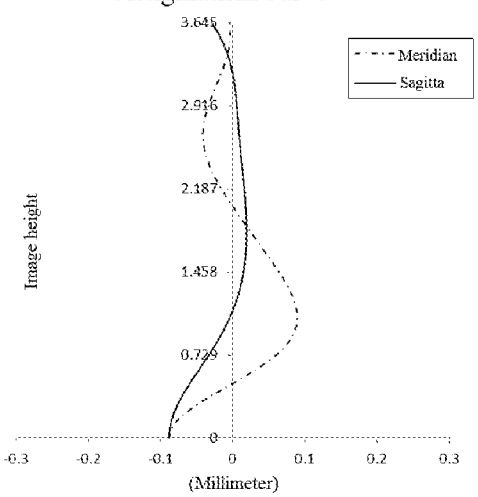
FIG. 33 is a diagram showing an astigmatism curve (mm) of the camera lens in embodiment 7.
Figure 34:
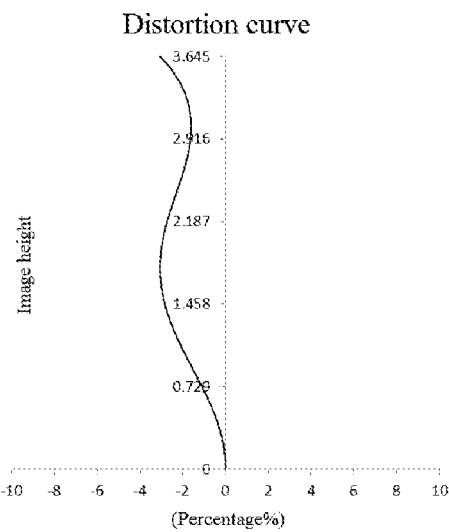
FIG. 34 is a diagram showing a distortion curve (%) of the camera lens in embodiment 7.
Figure 35:
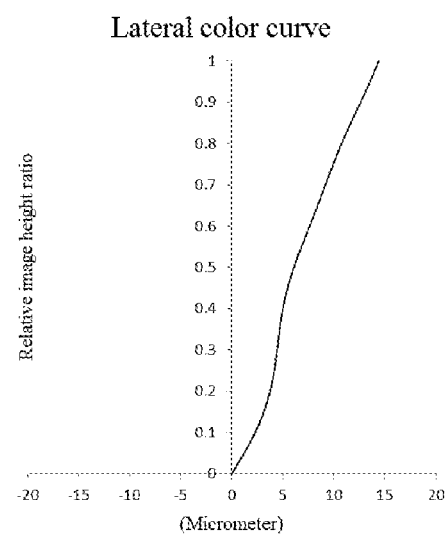
FIG. 35 is a diagram showing a lateral color curve (μm) of the camera lens in embodiment 7.
Figure 36:
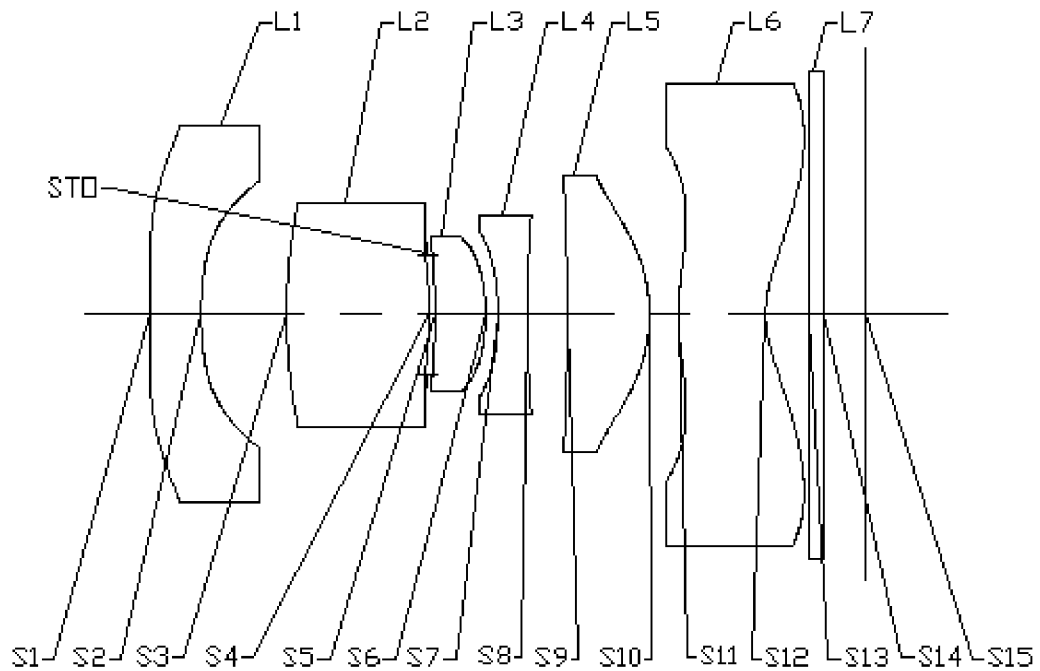
FIG. 36 is a schematic view of a camera lens according to embodiment 8.
Figure 37:
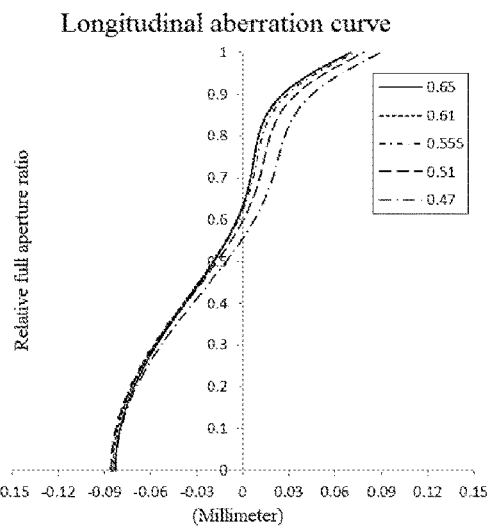
FIG. 37 is a diagram showing a longitudinal aberration curve (mm) of the camera lens in embodiment 8.
Figure 38:
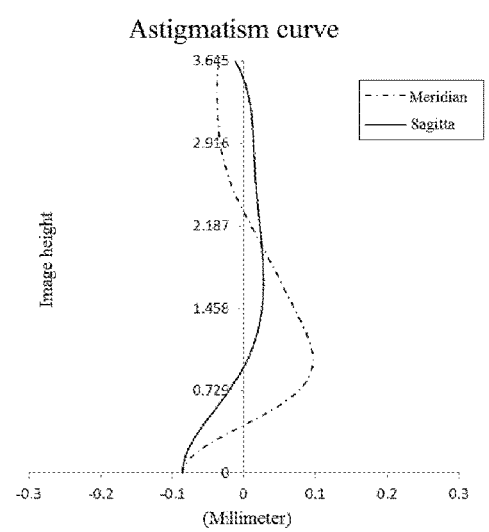
FIG. 38 is a diagram showing an astigmatism curve (mm) of the camera lens in embodiment 8.
Figure 39:
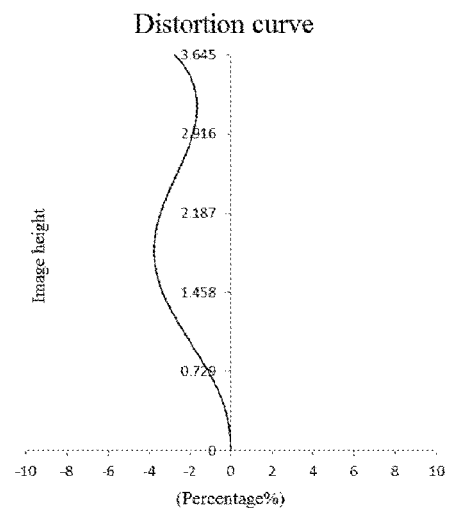
FIG. 39 is a diagram showing a distortion curve (%) of the camera lens in embodiment 8.
Figure 40:
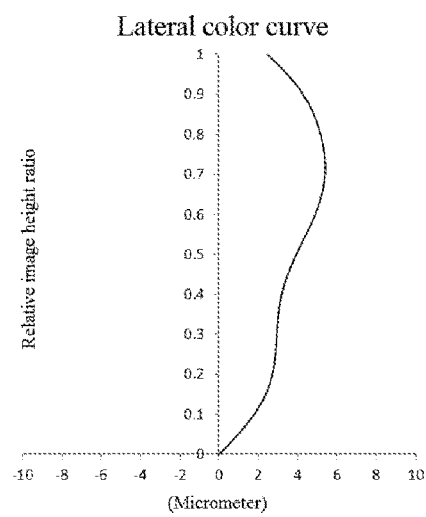
FIG. 40 is a diagram showing a lateral color curve (μm) of the camera lens in embodiment 8.
Figure 41:
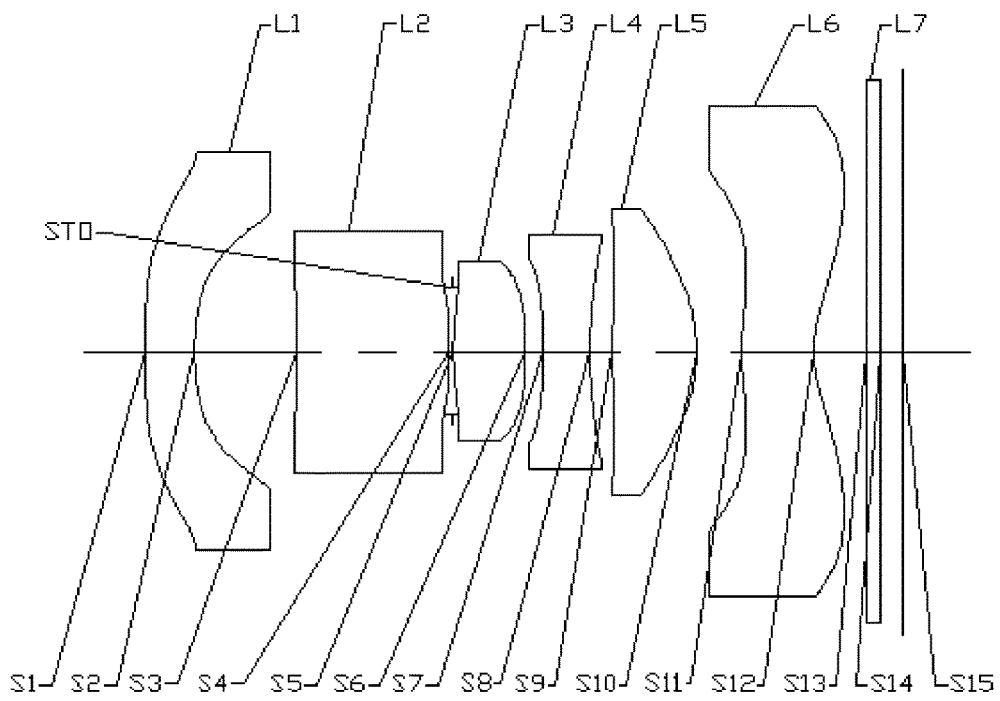
FIG. 41 is a schematic view of a camera lens according to embodiment 9.
Figure 42:
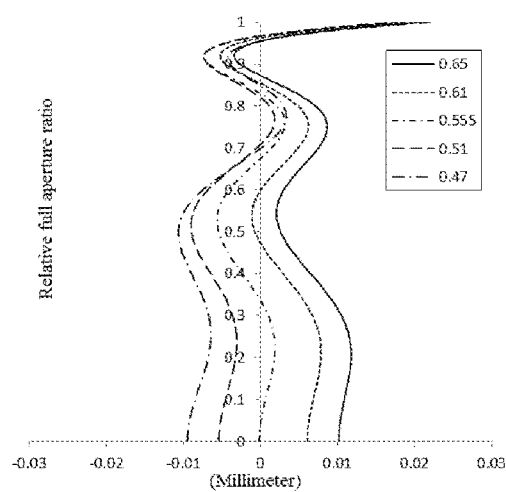
FIG. 42 is a diagram showing a longitudinal aberration curve (mm) of the camera lens in embodiment 9.
Figure 43:
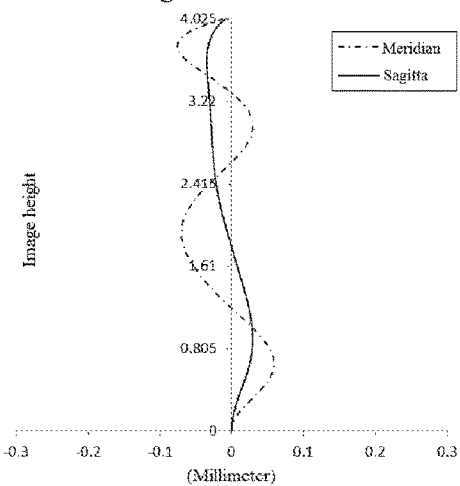
FIG. 43 is a diagram showing an astigmatism curve (mm) of the camera lens in embodiment 9.
Figure 47:
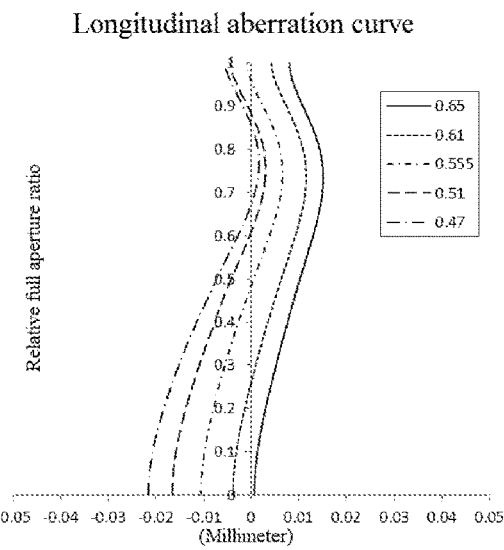
FIG. 47 is a diagram showing a longitudinal aberration curve (mm) of the camera lens in embodiment 10.
Figure 48:
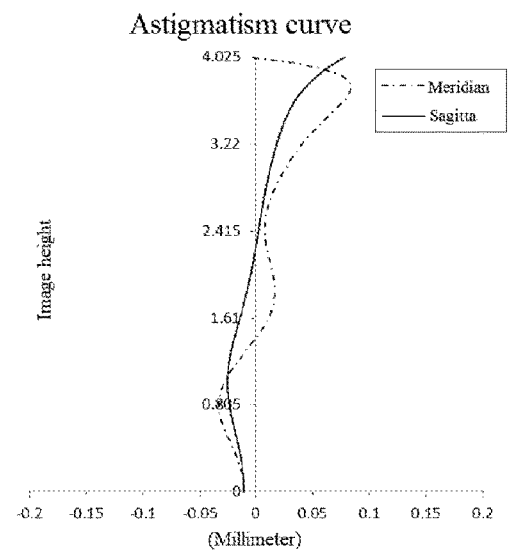
FIG. 48 is a diagram showing an astigmatism curve (mm) of the camera lens in embodiment 10.
Figure 49:
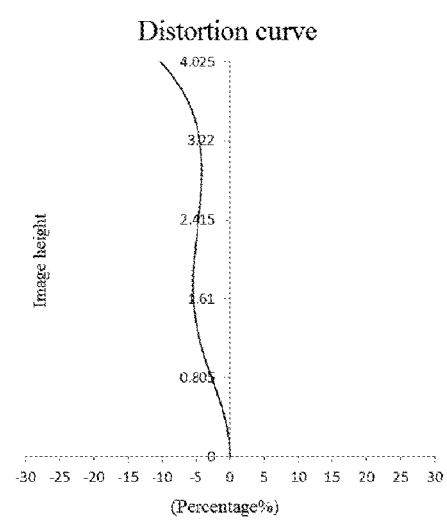
FIG. 49 is a diagram showing a distortion curve (%) of the camera lens in embodiment 10.
Figure 50:
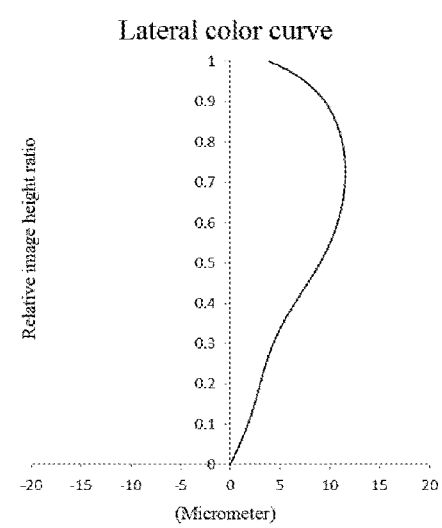
FIG. 50 is a diagram showing a lateral color curve (μm) of the camera lens in embodiment 10.
Figure 51:
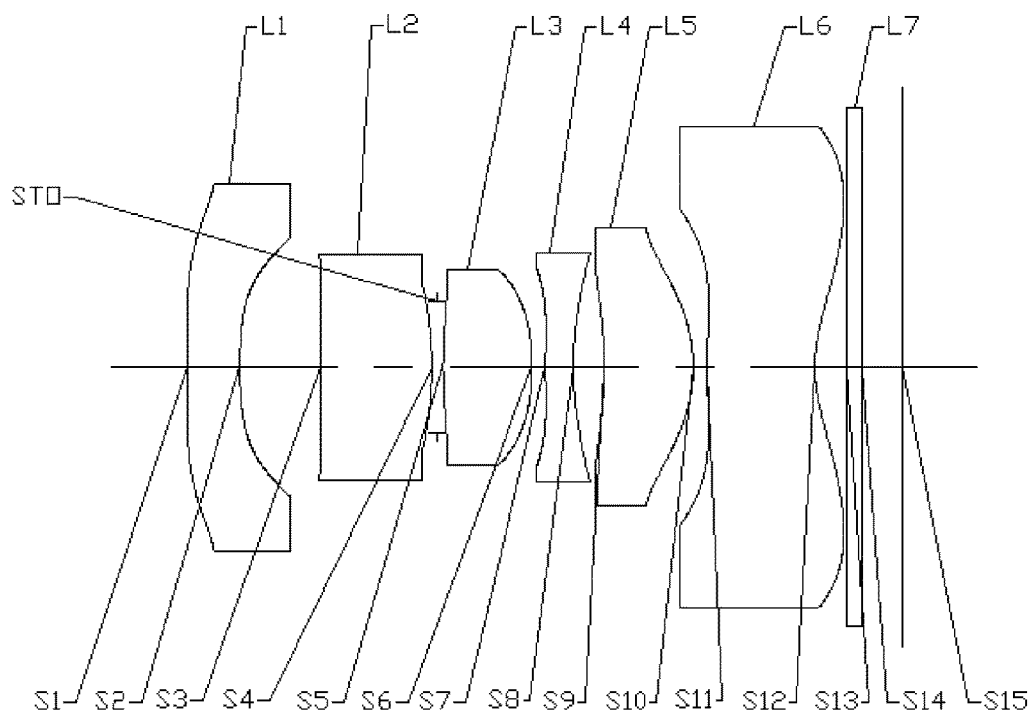
FIG. 51 is a schematic view of a camera lens according to embodiment 11.
Figure 52:
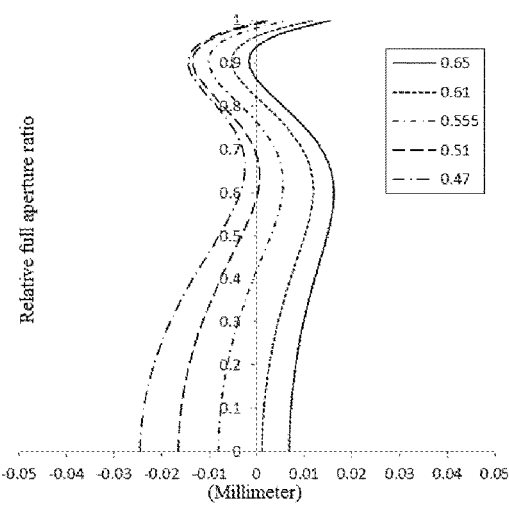
FIG. 52 is a diagram showing a longitudinal aberration curve (mm) of the camera lens in embodiment 11.
Figure 53:
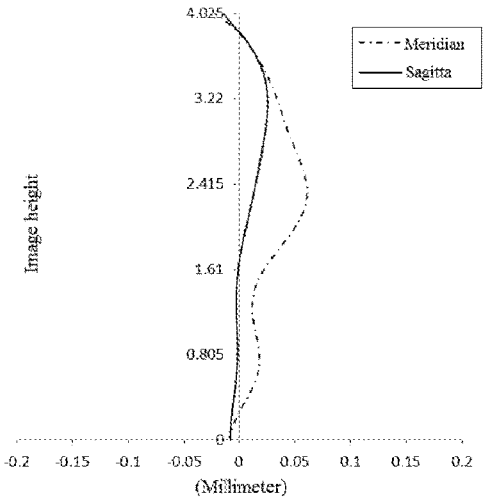
FIG. 53 is a diagram showing an astigmatism curve (mm) of the camera lens in embodiment 11.
Figure 54:
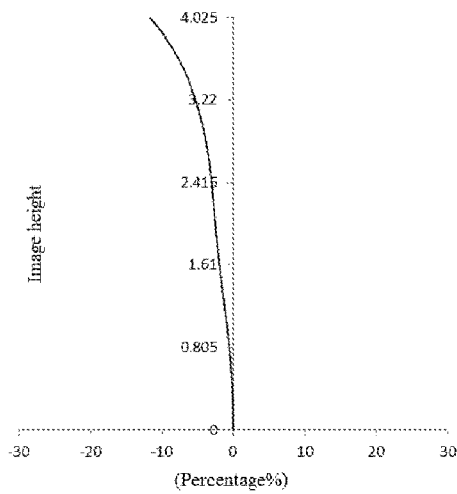
FIG. 54 is a diagram showing a distortion curve (%) of the camera lens in embodiment 11.
Figure 55:
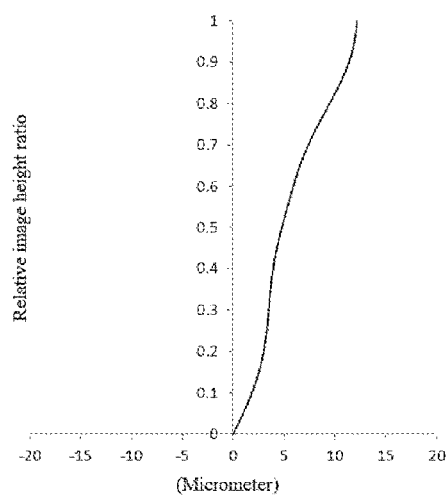
FIG. 55 is a diagram showing a lateral color curve (μm) of the camera lens in embodiment 11.
Figure 56:
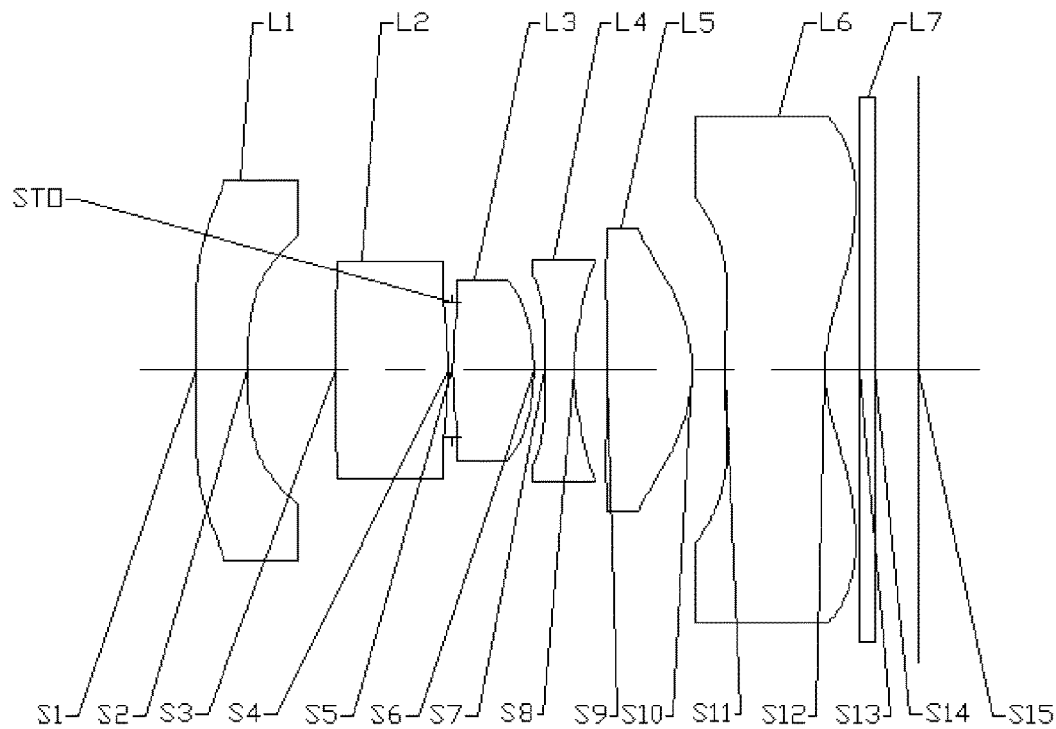
FIG. 56 is a schematic view of a camera lens according to embodiment 12.
Figure 57:
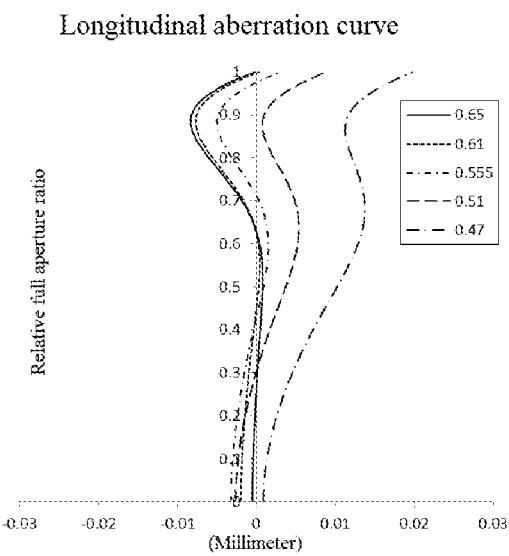
FIG. 57 is a diagram showing a longitudinal aberration curve (mm) of the camera lens in embodiment 12.
Figure 58:
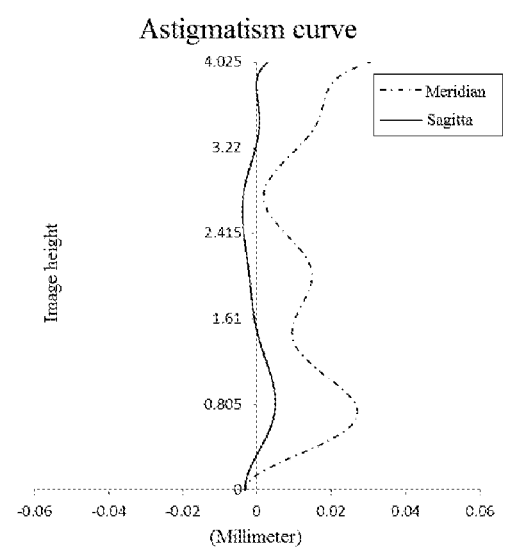
FIG. 58 is a diagram showing an astigmatism curve (mm) of the camera lens in embodiment 12.
Figure 59:
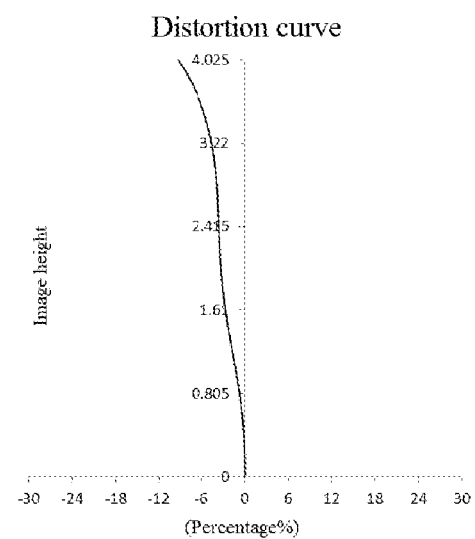
FIG. 59 is a diagram showing a distortion curve (%) of the camera lens in embodiment 12.
Figure 60:
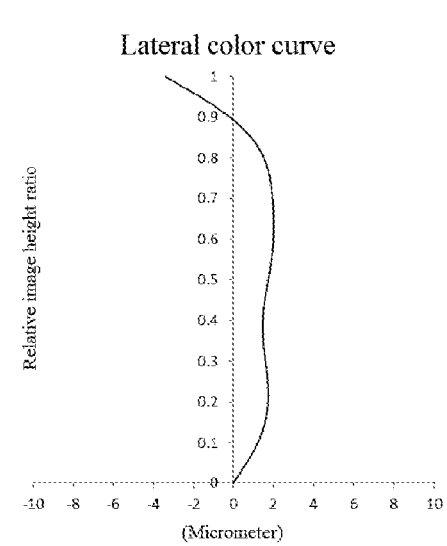
FIG. 60 is a diagram showing a lateral color curve (μm) of the camera lens in embodiment 12.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, it should be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Referring to FIG. 1, a camera lens according to embodiments of the present disclosure includes a first lens L1 having a negative refractive power, a second lens L2 having a positive refractive power, a third lens L3 having a positive refractive power, a fourth lens L4 having a negative refractive power, a fifth lens L5 having a positive refractive power and a sixth lens L6 having a negative refractive power in sequence from an object side to an image side.

The first lens L1 has an object-side surface S1 and an image-side surface S2. Material of the second lens L2 is glass, the second lens L2 has an object-side surface S3 and an image-side surface S4, and the image-side surface S4 is a convex surface. The third lens has an object-side surface S5 and an image-side surface S6, and the image-side surface S6 is a convex surface. The fourth lens L4 has an object-side surface S7 and an image-side surface S8. The fifth lens L5 has an object-side surface S9 and an image-side surface S10. The sixth lens S6 has an object-side surface S11 and an image-side surface S12, the object-side surface S11 is a convex surface, and the image-side surface S12 is a concave surface.

In some embodiments, the camera lens further includes an aperture stop STO disposed between the second lens L2 and the third lens L3.

During imaging, rays emitted or reflected by an object OBJ enter the camera lens from the first lens L1 and pass through an optical filter L7 having an object-side surface S13 and an image-side surface S14, and is finally imaged at an imaging surface S15.

In some embodiments, the camera lens satisfies a conditional expression:

$$-1.7 < f2/f4 < -0.7,$$

in which, f2 denotes an effective focal length of the second lens L2; f4 denotes an effective focal length of the fourth lens L4.

In the camera according to embodiments of the present disclosure, the first lens L1 has the negative refractive power, so that a field angle of the camera lens may be effectively increased, and also, it is ensured that an edge of the imaging surface S15 has sufficient luminance, thereby facilitating a wide angle of the camera lens have. Moreover, satisfying the above conditional expression will allows the refractive powers of the second lens L2 and the fourth lens L4 to be allocated reasonably, so that the camera lens may effectively correct various optical aberrations, for example a distortion, and thus the distortion still may be effectively controlled even if the camera lens has a relatively large field angle. The material of the second lens L2 is glass, which may eliminate a thermal aberration and allow the camera lens to be applied at different environmental temperatures.

In some embodiments, the camera lens further satisfies a conditional expression:

$$1 < f2/f < 3,$$

in which, f2 denotes the effective focal length of the second lens L2; f denotes an effective focal length of the camera lens.

Satisfying the above conditional expression allows the refractive power of the camera lens to be allocated reasonably, so that the second lens L2 has a relatively appropriate refractive power, thereby effective eliminating the thermal aberration.

In some embodiments, the camera lens further satisfies a conditional expression:

$$0.3 < CT1/CT2 < 0.9,$$

in which, CT1 denotes a center thickness of the first lens in an optical axis; CT2 denotes a center thickness of the second lens L2 in the optical axis.

It is not beneficial for achieving a one-way assembling of the camera lens if the ratio value is too large, while it is not beneficial for correcting the optical aberration if the ratio value is too small. Satisfying the above conditional expression is beneficial to allocating the center thicknesses of the first lens L1 and the second lens L2 reasonably, thereby balancing various optical aberrations of the camera lens, improving an imaging quality of the camera lens, and also ensuring manufacturability of assembling.

In some embodiments, the camera lens further satisfies a conditional expression:

$0.03 < SAG11/TTL < 0.08$, in which, SAG11 denotes an axial distance from an intersection point of the object-side surface S1 of the first lens L1 with the optical axis to a vertex of an effective radius of the object-side surface S1 of the first lens L1; TTL denotes an axial distance from the object-side surface S1 of the first lens L1 to the imaging surface S15.

The first lens L1 plays an important role in correcting an off-axis optical aberration. Requirements of balancing the optical aberration and increasing the filed angle cannot be satisfied if the ratio value is too large, while an incident angle of marginal rays may be increased if the ratio value is too small, thereby going against ensuring an edge luminance.

In some embodiments, the camera lens further satisfies a conditional expression:

$0.05 < SAG12/TTL < 0.1$, in which, SAG12 denotes an axial distance from an intersection point of the image-side surface S2 of the first lens L1 with the optical axis to a vertex of an effective radius of the image-side surface S2 of the first lens L1; TTL denotes the axial distance from the object-side surface S1 of the first lens L1 to the imaging surface S15.

Satisfying the above conditional expression allows a shape of the image-side surface S2 of the first lens L1 to be relatively uniform, thereby further improving the manufacturability of the first lens L1. Moreover, the first lens L1 has a uniform thickness, thereby reducing sensibility of the camera lens.

In some embodiments, the image-side surface S10 of the fifth lens L5 is a convex surface.

Satisfying the above condition is beneficial for ensuring the positive refractive power of the fifth lens L5.

In some embodiments, the camera lens further satisfies a conditional expression:

$0.5 < DT11/DT62 < 1$, in which, DT11 denotes the effective radius of the object-side surface S1 of the first lens L1; DT62 denotes an effective radius of the image-side S12 of the sixth lens L6.

Satisfying the above conditional expression ensures uniformity of lateral dimensions of the first lens L1 and the sixth lens L6, thereby ensuring the manufacturability of the assembling of the camera lens. Moreover, the distortion may be effectively corrected by an optimization design of the lens.

In some embodiments, the camera lens further satisfies a conditional expression:

$1.1 < DT11/DT52 < 1.5$, in which, DT11 denotes the effective radius of the object-side surface S1 of the first lens L1; DT52 denotes an effective radius of the image-side surface S10 of the fifth lens L5.

Satisfying the above conditional expression allows the refractive power of the first lens L1 and the refractive power of the fifth lens L5 to be allocated reasonably, thereby effectively correcting the distortion and also eliminating the optical aberration.

In some embodiments, the camera lens further satisfies a conditional expression:

$1 < ImgH/f < 1.5$, in which, ImgH denotes a half of a diagonal line of an effective pixel area in the imaging surface S15; f denotes the effective focal length of the camera lens.

Satisfying the above conditional expression is beneficial for reducing a volume of the camera lens and enlarging the field angle of the camera lens, thereby providing a relatively wide coverage. Moreover, the camera lens has an appropriate focal length, thereby having a relatively long depth of field.

In some embodiments, the image-side surface S2 of the first lens L1 is a concave surface.

Satisfying the above condition is beneficial for ensuring the negative refractive power of the first lens L1, so as to ensure a sufficient back focal length and also to reduce an angle of a principal ray entering the second lens L2, thereby facilitating an increase of the field angle. In addition, an incident angle of rays in the object-side surface S1 may be reduced, which is beneficial for ensuring the edge of the imaging surface S15 to have the sufficient luminance.

In some embodiments, the first lens L1, the third lens L3, the fourth lens L4, the fifth lens L5 and the sixth lens L6 each may adopt a plastic aspherical lens. A surface shape of an aspheric surface is defined by a following formula:

$$x = \frac{ch^2}{1 + \sqrt{1 - (k+1)c^2h^2}} + \sum A_i h^i$$

in which, h denotes a height from any point in the aspheric surface to the optical axis, c denotes a vertex curvature, k denotes a conic coefficient, Ai denotes an i-th order correction coefficient of the aspheric surface.

Since the plastic aspheric lens is adopted, the optical aberration is effectively eliminated while the miniaturization is ensured, thus satisfying a requirement for high resolution and reducing a cost.

Embodiment 1

Referring to FIG. 1 to FIG. 5, in embodiment 1, the camera lens satisfies following conditions shown in following tables:

TABLE 1

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −7.7148 | 0.7015 | 1.535/55.78 | −87.6627 |
| S2 | Aspheric Surface | 26.4563 | 1.1057 | | −99.9900 |
| S3 | Spherical Surface | Infinite | 1.3200 | 1.755/52.32 | |

TABLE 1-continued

| Surface Number | Surface Type | Radius of Curvature | Thickness | Material | Conic Coefficient |
|---|---|---|---|---|---|
| S4 | Spherical Surface | −5.9748 | 0.0960 | | |
| STO | Spherical Surface | Infinite | 0.1180 | | |
| S5 | Aspheric Surface | 11.1540 | 1.0901 | 1.535/55.78 | −74.2030 |
| S6 | Aspheric Surface | −3.8765 | 0.2529 | | 6.0089 |
| S7 | Aspheric Surface | 10.5335 | 0.4000 | 1.640/23.53 | 46.5584 |
| S8 | Aspheric Surface | 3.6644 | 0.5124 | | −9.3315 |
| S9 | Aspheric Surface | −50.0000 | 1.5523 | 1.535/55.78 | −99.9900 |
| S10 | Aspheric Surface | −1.5300 | 0.1084 | | −2.1876 |
| S11 | Aspheric Surface | 6.7287 | 1.0000 | 1.640/23.53 | −99.9900 |
| S12 | Aspheric Surface | 1.3399 | 0.5927 | | −4.4422 |
| S13 | Spherical Surface | Infinite | 0.2100 | 1.517/64.17 | |
| S14 | Spherical Surface | Infinite | 0.5870 | | |
| S15 | Spherical Surface | Infinite | | | |

TABLE 2

| Surface Number | A4 | A6 | A8 | A10 | A12 | A14 | A16 |
|---|---|---|---|---|---|---|---|
| S1 | 2.5502E−02 | −2.2330E−03 | −2.0315E−04 | 1.1457E−04 | −1.6597E−05 | 7.3637E−07 | 2.0846E−09 |
| S2 | 6.5820E−02 | −1.9652E−02 | 1.7692E−02 | −1.1641E−02 | 4.7002E−03 | −9.8490E−04 | 7.9152E−05 |
| S5 | −1.4857E−02 | −1.4332E−02 | 3.1429E−03 | −7.4837E−03 | −2.7291E−04 | 0.0000E+00 | 0.0000E+00 |
| S6 | −7.6802E−02 | 2.2967E−02 | 3.2638E−03 | −7.6618E−03 | 1.7104E−03 | 0.0000E+00 | 0.0000E+00 |
| S7 | −1.0314E−01 | 1.2538E−02 | 2.8598E−02 | −2.0351E−02 | 3.7246E−03 | 5.8136E−04 | −2.3922E−04 |
| S8 | −8.7103E−03 | −1.2419E−02 | 2.9256E−02 | −2.0626E−02 | 7.6960E−03 | −1.5682E−03 | 1.3680E−04 |
| S9 | 2.2447E−02 | −2.2871E−02 | 1.8134E−02 | −9.1255E−03 | 2.6648E−03 | −4.0266E−04 | 2.4389E−05 |
| S10 | 4.5117E−02 | −5.9416E−02 | 3.8650E−02 | −1.3699E−02 | 2.6643E−03 | −2.6357E−04 | 1.0398E−05 |
| S11 | −5.5372E−03 | −4.2275E−02 | 3.0387E−02 | −1.0403E−02 | 1.9002E−03 | −1.7750E−04 | 6.6587E−06 |
| S12 | −3.2388E−02 | 6.1966E−03 | −4.2310E−04 | −5.5642E−05 | 1.1634E−05 | −7.3502E−07 | 1.6041E−08 |

TABLE 3

| f1 (mm) | −11.05 | f (mm) | 3.47 |
|---|---|---|---|
| f2 (mm) | 7.89 | Fno | 2.44 |
| f3 (mm) | 5.50 | TTL (mm) | 9.65 |
| f4 (mm) | −8.92 | | |
| f5 (mm) | 2.91 | | |
| f6 (mm) | −2.80 | | |

Embodiment 2

Referring to FIG. 6-FIG. 10, in embodiment 2, the camera lens satisfies following conditions shown in following tables:

TABLE 4

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −8.5881 | 0.7000 | 1.535/55.78 | −99.9900 |
| S2 | Aspheric Surface | 14.8963 | 1.0732 | | −21.6949 |
| S3 | Spherical Surface | 254.2299 | 1.3200 | 1.754/52.43 | |
| S4 | Spherical Surface | −6.0626 | 0.1723 | | |
| STO | Spherical Surface | Infinite | 0.0976 | | |
| S5 | Aspheric Surface | 10.7570 | 1.1203 | 1.535/55.78 | −48.9231 |
| S6 | Aspheric Surface | −3.8732 | 0.2519 | | 6.0525 |
| S7 | Aspheric Surface | 10.5893 | 0.4739 | 1.640/23.53 | 45.3901 |
| S8 | Aspheric Surface | 3.6535 | 0.4714 | | −9.0167 |
| S9 | Aspheric Surface | −57.1356 | 1.5363 | 1.535/55.78 | −99.9900 |
| S10 | Aspheric Surface | −1.6981 | 0.2185 | | −2.0629 |
| S11 | Aspheric Surface | 7.1252 | 1.0000 | 1.640/23.53 | −99.9900 |
| S12 | Aspheric Surface | 1.4907 | 0.5647 | | −4.7883 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 5

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | −1.3575E−02 | −1.3725E−02 | 3.7208E−03 | −6.8017E−03 | −9.5643E−04 | 0.0000E+00 | 0.0000E+00 |
| S6 | −7.6631E−02 | 2.3076E−02 | 3.1488E−03 | −7.5103E−03 | 1.8165E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−02 | −1.6351E−02 | 2.6111E−02 | −1.5810E−02 | 5.1536E−03 | −9.0947E−04 | 6.8600E−05 |
| S9 | 1.6366E−02 | −9.0587E−03 | 4.8667E−03 | −2.1085E−03 | 5.7942E−04 | −8.0461E−05 | 4.4036E−06 |
| S10 | 1.3632E−02 | −9.1740E−03 | 3.5610E−03 | −5.7567E−04 | −4.9567E−05 | 2.6274E−05 | −1.9616E−06 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 6

| f1 (mm) | −10.04 | f (mm) | 3.55 |
|---|---|---|---|
| f2 (mm) | 7.84 | Fno | 2.41 |
| f3 (mm) | 5.45 | TTL (mm) | 9.80 |
| f4 (mm) | −8.89 | | |
| f5 (mm) | 3.23 | | |
| f6 (mm) | −3.14 | | |

Embodiment 3

Referring to FIG. 11 to FIG. 15, in embodiment 3, the camera lens satisfies following conditions shown in following tables:

TABLE 7

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −8.7466 | 0.7095 | 1.535/55.78 | −99.9900 |
| S2 | Aspheric Surface | 14.6280 | 1.0615 | | −21.8005 |
| S3 | Spherical Surface | −134.1816 | 1.3200 | 1.754/52.43 | |
| S4 | Spherical Surface | −6.0489 | 0.2580 | | |
| STO | Spherical Surface | Infinite | 0.0576 | | |
| S5 | Aspheric Surface | 9.1272 | 1.0576 | 1.535/55.78 | −55.3265 |
| S6 | Aspheric Surface | −3.8289 | 0.2397 | | 6.2426 |
| S7 | Aspheric Surface | 10.4414 | 0.4824 | 1.640/23.53 | 45.2233 |
| S8 | Aspheric Surface | 3.6251 | 0.4777 | | −8.5609 |
| S9 | Aspheric Surface | −46.0621 | 1.5822 | 1.535/55.78 | 50.0000 |
| S10 | Aspheric Surface | −1.5760 | 0.0767 | | −2.0476 |
| S11 | Aspheric Surface | 4.8920 | 1.0000 | 1.640/23.53 | −71.1816 |
| S12 | Aspheric Surface | 1.2677 | 0.5954 | | −4.9153 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 8

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | −1.2674E−02 | −1.3256E−02 | 5.1242E−04 | −7.1328E−03 | −9.5643E−04 | 0.0000E+00 | 0.0000E+00 |
| S6 | −7.1159E−02 | 2.1204E−02 | 4.5097E−03 | −8.2509E−03 | 1.8165E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−02 | −1.6351E−02 | 2.6111E−02 | −1.5810E−02 | 5.1536E−03 | −9.0947E−04 | 6.8600E−05 |
| S9 | 1.6366E−02 | −9.0587E−03 | 4.8667E−03 | −2.1085E−03 | 5.7942E−04 | −8.0461E−05 | 4.4036E−06 |
| S10 | 1.3632E−02 | −9.1740E−03 | 3.5610E−03 | −5.7567E−04 | −4.9567E−05 | 2.6274E−05 | −1.9616E−06 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 9

| f1 (mm) | −10.09 | f (mm) | 3.38 |
|---|---|---|---|
| f2 (mm) | 8.34 | Fno | 2.46 |
| f3 (mm) | 5.17 | TTL (mm) | 9.72 |
| f4 (mm) | −8.86 | | |
| f5 (mm) | 3.00 | | |
| f6 (mm) | −2.98 | | |

Embodiment 4

Referring to FIG. 16 to FIG. 20, in embodiment 4, the camera lens satisfies following conditions shown in following tables:

TABLE 10

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −7.6418 | 0.7001 | 1.535/55.78 | −90.1669 |
| S2 | Aspheric Surface | 14.0464 | 1.2477 | | 12.1492 |
| S3 | Spherical Surface | 79.8892 | 1.3200 | 1.807/43.42 | |
| S4 | Spherical Surface | −6.5034 | 0.1726 | | |
| STO | Spherical Surface | Infinite | 0.0811 | | |
| S5 | Aspheric Surface | 6.0436 | 1.5502 | 1.535/55.78 | −47.1271 |
| S6 | Aspheric Surface | −4.9373 | 0.0732 | | 9.0378 |
| S7 | Aspheric Surface | 4.8184 | 0.4075 | 1.640/23.53 | −26.0873 |
| S8 | Aspheric Surface | 2.5033 | 0.4301 | | −8.1831 |
| S9 | Spherical Surface | 7.7673 | 0.7761 | 1.535/55.78 | |
| S10 | Spherical Surface | −76.7151 | 0.0519 | | |
| S11 | Aspheric Surface | 3.8238 | 1.7612 | 1.640/23.53 | −8.0174 |
| S12 | Aspheric Surface | 3.0605 | 0.4405 | | −5.1550 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 11

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | 1.5256E−02 | −5.9419E−03 | −9.6418E−03 | 3.2758E−03 | −9.5643E−04 | 0.0000E+00 | 0.0000E+00 |
| S6 | −1.0114E−01 | 2.6453E−02 | 8.7275E−03 | −9.0650E−03 | 1.8165E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−03 | −1.6351E−02 | 2.6111E−02 | −1.5810E−02 | 5.1536E−03 | −9.0947E−04 | 6.8600E−05 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 12

| f1 (mm) | −9.12 | f (mm) | 3.38 |
|---|---|---|---|
| f2 (mm) | 7.47 | Fno | 2.47 |
| f3 (mm) | 5.32 | TTL (mm) | 9.71 |
| f4 (mm) | −8.86 | | |
| f5 (mm) | 13.18 | | |
| f6 (mm) | −248.66 | | |

Embodiment 5

Referring to FIG. 21 to FIG. 25, in embodiment 5, the camera lens satisfies following conditions shown in following tables:

TABLE 13

| Surface Number | Surface Type | Radius of Curvature | Thickness | Material | Conic Coefficient |
|---|---|---|---|---|---|
| OBJ | Spherical Surface | Infinite | Infinite | | |
| S1 | Aspheric Surface | −8.1579 | 0.7364 | 1.535/55.78 | −95.4549 |

TABLE 13-continued

| Surface Number | Surface Type | Radius of Curvature | Thickness | Material | Conic Coefficient |
|---|---|---|---|---|---|
| S2 | Aspheric Surface | 12.9310 | 1.2598 | | 20.1337 |
| S3 | Spherical Surface | −40.9789 | 1.3200 | 1.804/46.57 | 0.0000 |
| S4 | Spherical Surface | −5.6800 | 0.1331 | | 0.0000 |
| STO | Spherical Surface | Infinite | 0.1193 | | 0.0000 |
| S5 | Aspheric Surface | 5.5011 | 1.5794 | 1.535/55.78 | −34.6177 |
| S6 | Aspheric Surface | −5.5371 | 0.0798 | | 11.7607 |
| S7 | Aspheric Surface | 4.7877 | 0.4000 | 1.640/23.53 | −2.22E+01 |
| S8 | Aspheric Surface | 2.7031 | 0.5800 | | −7.4686 |
| S9 | Aspheric Surface | 13.0031 | 0.9482 | 1.535/55.78 | 0.0000 |
| S10 | Aspheric Surface | −6.4307 | 0.2000 | | 0.0000 |
| S11 | Aspheric Surface | 3.0690 | 1.2035 | 1.640/23.53 | −9.7783 |
| S12 | Aspheric Surface | 1.8386 | 0.4755 | | −5.2308 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 14

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | 1.6306E−02 | −7.5431E−03 | −6.3235E−03 | 1.2815E−03 | −9.5643E−04 | 0.0000E+00 | 0.0000E+00 |
| S6 | −1.0473E−01 | 2.7607E−02 | 8.3324E−03 | −9.0293E−03 | 1.8165E−03 | 0.0000E+00 | 0.0000E+00 |
| S7 | −9.9361E−03 | 5.8547E−03 | 2.8284E−02 | −1.7551E−02 | 2.0642E−03 | 1.0862E−03 | −2.9232E−04 |
| S8 | −3.2031E−03 | −1.6351E−02 | 2.6111E−02 | −1.5810E−02 | 5.1536E−03 | −9.0947E−04 | 6.8600E−05 |
| S9 | −6.1303E−04 | −2.3412E−04 | −2.2613E−05 | 5.4321E−06 | 0.0000E+00 | 0.0000E+00 | 0.0000E+00 |
| S10 | 4.6864E−04 | 2.4689E−04 | 2.4620E−05 | −1.4718E−06 | −1.1674E−06 | 0.0000E+00 | 0.0000E+00 |
| S11 | −3.0441E−03 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 15

| f1 (mm) | −9.21 | f (mm) | 3.34 |
|---|---|---|---|
| f2 (mm) | 8.04 | Fno | 2.49 |
| f3 (mm) | 5.41 | TTL (mm) | 9.84 |
| f4 (mm) | −10.41 | | |
| f5 (mm) | 8.15 | | |
| f6 (mm) | −11.54 | | |

Embodiment 6

Referring to FIG. 26 to FIG. 30, in embodiment 6, the camera lens satisfies following conditions shown in following tables:

TABLE 16

| Surface Number | Surface Type | Radius of Curvature | Thickness | Material | Conic Coefficient |
|---|---|---|---|---|---|
| OBJ | Spherical Surface | Infinite | 100000.0000 | | |
| S1 | Aspheric Surface | 67.8996 | 0.7040 | 1.535/55.78 | −99.9900 |
| S2 | Aspheric Surface | 4.5321 | 1.5602 | | −6.1571 |
| S3 | Spherical Surface | 11.5248 | 1.4493 | 1.755/52.32 | |
| S4 | Spherical Surface | −11.5248 | 0.0746 | | |
| STO | Spherical Surface | Infinite | 0.1140 | | |
| S5 | Aspheric Surface | 6.9663 | 0.9005 | 1.535/55.78 | −84.4451 |
| S6 | Aspheric Surface | −3.3577 | 0.1189 | | 5.3645 |
| S7 | Aspheric Surface | 7.1891 | 0.4000 | 1.640/23.53 | 6.1860 |
| S8 | Aspheric Surface | 2.6408 | 0.5187 | | −7.0738 |
| S9 | Aspheric Surface | −10.8677 | 1.1623 | 1.535/55.78 | 0.0000 |
| S10 | Aspheric Surface | −2.1661 | 0.3072 | | 0.0000 |
| S11 | Aspheric Surface | 4.2583 | 1.3514 | 1.640/23.53 | −39.8986 |
| S12 | Aspheric Surface | 1.6970 | 0.4683 | | −5.7305 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 17

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | 1.6173E−02 | −4.2844E−02 | 2.6791E−02 | −2.3084E−02 | −9.5643E−04 | 0.0000E+00 | 0.0000E+00 |
| S6 | −4.7618E−02 | −4.9215E−04 | 2.2572E−02 | −1.5992E−02 | 1.8165E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−03 | −1.6351E−02 | 2.6111E−02 | −1.5810E−02 | 5.1536E−03 | −9.0947E−04 | 6.8600E−05 |
| S9 | 9.8102E−03 | −1.1771E−03 | 9.8364E−04 | −2.3638E−04 | 0.0000E+00 | 0.0000E+00 | 0.0000E+00 |
| S10 | 6.6223E−04 | 6.4027E−03 | 2.3936E−04 | −5.4624E−05 | 1.2003E−05 | 0.0000E+00 | 0.0000E+00 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 18

| f1 (mm) | −9.08 | f (mm) | 3.33 |
|---|---|---|---|
| f2 (mm) | 7.82 | Fno | 2.52 |
| f3 (mm) | 4.35 | TTL (mm) | 9.93 |
| f4 (mm) | −6.71 | | |
| f5 (mm) | 4.81 | | |
| f6 (mm) | −5.52 | | |

Embodiment 7

Referring to FIG. 31 to FIG. 35, in embodiment 7, the camera lens satisfies following conditions shown in following tables:

TABLE 19

| Surface Number | Surface Type | Radius of Curvature | Thickness | Material | Conic Coefficient |
|---|---|---|---|---|---|
| OBJ | Spherical Surface | Infinite | 100000.0000 | | |
| S1 | Aspheric Surface | −63.5900 | 0.7000 | 1.535/55.78 | 50.0000 |
| S2 | Aspheric Surface | 5.2582 | 1.4312 | | −12.8906 |
| S3 | Spherical Surface | 11.6366 | 1.3200 | 1.755/52.32 | |
| S4 | Spherical Surface | −11.6366 | 0.0782 | | |
| STO | Spherical Surface | Infinite | 0.0443 | | |
| S5 | Aspheric Surface | 6.6308 | 0.8882 | 1.535/55.78 | −95.7441 |
| S6 | Aspheric Surface | −2.6418 | 0.1665 | | 3.5823 |
| S7 | Aspheric Surface | −3.5176 | 0.4000 | 1.640/23.53 | −18.2980 |
| S8 | Aspheric Surface | −123.4542 | 0.5700 | | −99.9900 |
| S9 | Aspheric Surface | −6.9795 | 1.1709 | 1.535/55.78 | 0.0000 |
| S10 | Aspheric Surface | −2.2022 | 0.2888 | | 0.0000 |
| S11 | Aspheric Surface | 3.3834 | 1.3494 | 1.640/23.53 | −15.7047 |
| S12 | Aspheric Surface | 1.6146 | 0.5758 | | −4.3932 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 20

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | 2.4393E−02 | −5.0989E−02 | 3.0582E−02 | −3.8620E−02 | −9.5643E−04 | 0.0000E+00 | 0.0000E+00 |
| S6 | −2.6887E−02 | −2.2487E−02 | 3.1353E−02 | −1.7789E−02 | 1.8165E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−03 | −1.6351E−02 | 2.6111E−02 | −1.5810E−02 | 5.1536E−03 | −9.0947E−04 | 6.8600E−05 |
| S9 | 4.7254E−03 | −2.7046E−03 | 1.3383E−03 | −1.7543E−04 | 0.0000E+00 | 0.0000E+00 | 0.0000E+00 |
| S10 | −2.0621E−03 | 6.8849E−03 | 4.1788E−04 | −3.3711E−06 | 1.2003E−05 | 0.0000E+00 | 0.0000E+00 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 21

| f1 (mm) | -9.01 | f (mm) | 3.33 |
|---|---|---|---|
| f2 (mm) | 7.87 | Fno | 2.52 |
| f3 (mm) | 3.64 | TTL (mm) | 9.78 |
| f4 (mm) | -5.62 | | |
| f5 (mm) | 5.52 | | |
| f6 (mm) | -6.84 | | |

Embodiment 8

Referring to FIG. 36 to FIG. 40, in embodiment 8, the camera lens satisfies following conditions shown in following tables:

TABLE 22

| Surface Number | Surface Type | Radius of Curvature | Thickness | Material | Conic Coefficient |
|---|---|---|---|---|---|
| OBJ | Spherical Surface | Infinite | 100000.0000 | | |
| S1 | Aspheric Surface | -26.6306 | 0.7000 | 1.535/55.78 | 50.0000 |
| S2 | Aspheric Surface | 5.4719 | 1.1677 | | -16.5689 |
| S3 | Spherical Surface | 7.7752 | 1.9450 | 1.755/52.32 | |
| S4 | Spherical Surface | -5.6722 | -0.0235 | | |
| STO | Spherical Surface | Infinite | 0.0979 | | |
| S5 | Aspheric Surface | -182.8204 | 0.6970 | 1.535/55.78 | 50.0000 |
| S6 | Aspheric Surface | -2.8946 | 0.1692 | | 5.0539 |
| S7 | Aspheric Surface | -4.1381 | 0.4000 | 1.640/23.53 | -20.2756 |
| S8 | Aspheric Surface | 12.2130 | 0.5510 | | -99.9900 |
| S9 | Aspheric Surface | -23.2417 | 1.1221 | 1.535/55.78 | 0.0000 |
| S10 | Aspheric Surface | -2.2214 | 0.3928 | | 0.0000 |
| S11 | Aspheric Surface | 3.0784 | 1.1939 | 1.640/23.53 | -16.8255 |
| S12 | Aspheric Surface | 1.5131 | 0.5773 | | -4.6239 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 23

| Surface Number | A4 | A6 | A8 | A10 | A12 | A14 | A16 |
|---|---|---|---|---|---|---|---|
| S1 | 2.8192E-02 | -3.7512E-03 | 2.2374E-04 | 5.3310E-05 | -1.4922E-05 | 1.1671E-06 | -2.7364E-08 |
| S2 | 6.5792E-02 | -1.5910E-02 | 1.2638E-02 | -8.0443E-03 | 3.3960E-03 | -7.6182E-04 | 6.4887E-05 |
| S5 | -2.3520E-02 | -3.5931E-02 | 3.8998E-02 | -6.2570E-02 | -9.5643E-04 | 0.0000E+00 | 0.0000E+00 |
| S6 | -4.2657E-02 | -2.3018E-02 | 3.3027E-02 | -2.0755E-02 | 1.8165E-03 | 0.0000E+00 | 0.0000E+00 |
| S7 | -9.9361E-02 | 5.8547E-03 | 2.8284E-02 | -1.7551E-02 | 2.0642E-03 | 1.0862E-03 | -2.9232E-04 |
| S8 | -3.2031E-03 | -1.6351E-02 | 2.6111E-02 | -1.5810E-02 | 5.1536E-03 | -9.0947E-04 | 6.8600E-05 |
| S9 | 4.0794E-02 | -3.1026E-03 | 1.3942E-03 | -1.7362E-04 | 0.0000E+00 | 0.0000E+00 | 0.0000E+00 |
| S10 | -3.2171E-03 | 6.5438E-03 | 3.2148E-04 | -1.2009E-05 | 1.2003E-05 | 0.0000E+00 | 0.0000E+00 |
| S11 | -3.0441E-02 | -1.3805E-03 | 3.3400E-03 | -1.2277E-03 | 2.0976E-04 | -1.7070E-05 | 5.3359E-07 |
| S12 | -2.7888E-02 | 6.2645E-03 | -1.0292E-03 | 1.0897E-04 | -7.4593E-06 | 2.9832E-07 | -5.2726E-09 |

TABLE 24

| f1 (mm) | -8.39 | f (mm) | 3.32 |
|---|---|---|---|
| f2 (mm) | 4.62 | Fno | 2.52 |
| f3 (mm) | 5.47 | TTL (mm) | 9.79 |
| f4 (mm) | -4.75 | | |
| f5 (mm) | 4.49 | | |
| f6 (mm) | -6.59 | | |

Embodiment 9

Referring to FIG. 41 to FIG. 45, in embodiment 9, the camera lens satisfies following conditions shown in following tables:

TABLE 25

| Surface Number | Surface Type | Radius of Curvature | Thickness | Material | Conic Coefficient |
|---|---|---|---|---|---|
| OBJ | Spherical Surface | Infinite | 100000.0000 | | |
| S1 | Aspheric Surface | 29.7578 | 0.7000 | 1.599/61.00 | -99.9900 |

TABLE 25-continued

| Surface Number | Surface Type | Radius of Curvature | Thickness | Material | Conic Coefficient |
|---|---|---|---|---|---|
| S2 | Aspheric Surface | 4.1228 | 1.4435 | | −5.0745 |
| S3 | Spherical Surface | −58.9605 | 2.1693 | 1.755/52.32 | |
| S4 | Spherical Surface | −6.2384 | 0.0447 | | |
| STO | Spherical Surface | Infinite | 0.0153 | | |
| S5 | Aspheric Surface | 4.6944 | 1.0291 | 1.535/55.78 | 16.7798 |
| S6 | Aspheric Surface | −7.3850 | 0.2453 | | 13.9459 |
| S7 | Aspheric Surface | 172.5496 | 0.6612 | 1.640/23.53 | 50.0000 |
| S8 | Aspheric Surface | 4.2730 | 0.3259 | | −44.8270 |
| S9 | Aspheric Surface | 14.3963 | 1.1901 | 1.535/55.78 | 0.0000 |
| S10 | Aspheric Surface | −2.2942 | 0.6412 | | 0.0000 |
| S11 | Aspheric Surface | 4.2245 | 1.0225 | 1.651/21.52 | −31.5772 |
| S12 | Aspheric Surface | 1.6781 | 0.7368 | | −5.5067 |
| S13 | Spherical Surface | Infinite | 0.2100 | 1.517/64.17 | |
| S14 | Spherical Surface | Infinite | 0.3324 | | |
| S15 | Spherical Surface | Infinite | | | |

TABLE 26

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | −4.3384E−02 | 3.6527E−02 | −1.3412E−01 | 1.4624E−01 | −7.2191E−02 | 0.0000E+00 | 0.0000E+00 |
| S6 | −8.6289E−02 | 2.4782E−02 | −2.5844E−02 | 1.7885E−02 | −6.6647E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−03 | −1.6351E−02 | 2.6111E−02 | −1.5810E−02 | 5.1536E−03 | −9.0947E−04 | 6.8600E−05 |
| S9 | −1.5906E−02 | 1.6623E−03 | 1.5696E−03 | −4.9313E−04 | 0.0000E+00 | 0.0000E+00 | 0.0000E+00 |
| S10 | 1.3117E−02 | 2.9572E−03 | −1.1668E−04 | 4.4347E−04 | −1.6209E−06 | 0.0000E+00 | 0.0000E+00 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 27

| f1 (mm) | −8.05 | f (mm) | 3.18 |
|---|---|---|---|
| f2 (mm) | 9.05 | Fno | 2.38 |
| f3 (mm) | 5.51 | TTL (mm) | 10.77 |
| f4 (mm) | −6.81 | | |
| f5 (mm) | 3.78 | | |
| f6 (mm) | −5.04 | | |

Embodiment 10

Referring to FIG. 46 to FIG. 50, in embodiment 10, the camera lens satisfies following conditions shown in following tables:

TABLE 28

| Surface Number | Surface Type | Radius of Curvature | Thickness | Material | Conic Coefficient |
|---|---|---|---|---|---|
| OBJ | Spherical Surface | Infinite | 0.0000 | | |
| S1 | Aspheric Surface | −14.0530 | 0.7012 | 1.535/55.78 | −44.0543 |
| S2 | Aspheric Surface | 8.4649 | 1.2137 | | −99.9900 |
| S3 | Spherical Surface | 39.1162 | 1.5353 | 1.755/52.32 | |
| S4 | Spherical Surface | −7.9954 | 0.0450 | | |
| STO | Spherical Surface | Infinite | 0.0150 | | |
| S5 | Aspheric Surface | 5.3901 | 1.1183 | 1.535/55.78 | −52.7554 |
| S6 | Aspheric Surface | −3.2485 | 0.1512 | | 4.0354 |
| S7 | Aspheric Surface | 24.3952 | 0.4000 | 1.640/23.53 | 50.0000 |
| S8 | Aspheric Surface | 2.9419 | 0.4614 | | −9.9824 |
| S9 | Aspheric Surface | −13.3963 | 1.1504 | 1.535/55.78 | 0.0000 |
| S10 | Aspheric Surface | −2.2256 | 0.4442 | | 0.0000 |
| S11 | Aspheric Surface | 5.5334 | 1.3812 | 1.640/23.53 | −49.7443 |
| S12 | Aspheric Surface | 1.9689 | 0.4774 | | −4.8660 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 29

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | 3.6210E−02 | −4.7548E−02 | 2.6865E−02 | −1.3396E−02 | −9.5643E−04 | 0.0000E+00 | 0.0000E+00 |
| S6 | −3.7335E−02 | 5.7315E−04 | 1.5176E−02 | −1.0951E−02 | 1.8165E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−03 | −1.6351E−02 | 2.6111E−02 | −1.5810E−02 | 5.1536E−03 | −9.0947E−04 | 6.8600E−05 |
| S9 | 1.7184E−02 | −4.5756E−03 | 1.4903E−03 | −2.2598E−04 | 0.0000E+00 | 0.0000E+00 | 0.0000E+00 |
| S10 | 1.5258E−03 | 7.3251E−03 | −4.4901E−04 | 4.5659E−05 | 1.2003E−05 | 0.0000E+00 | 0.0000E+00 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 30

| f1 (mm) | −11.63 | f (mm) | 3.58 |
|---|---|---|---|
| f2 (mm) | 8.82 | Fno | 2.40 |
| f3 (mm) | 4.89 | TTL (mm) | 9.68 |
| f4 (mm) | −7.40 | | |
| f5 (mm) | 5.25 | | |
| f6 (mm) | −5.35 | | |

Embodiment 11

Referring to FIG. 51 to FIG. 55, in embodiment 11, the camera lens satisfies following conditions shown in following tables:

TABLE 31

| Surface Number | Surface Type | Radius of Curvature | Thickness | Material | Conic Coefficient |
|---|---|---|---|---|---|
| OBJ | Spherical Surface | Infinite | 0.0000 | | |
| S1 | Aspheric Surface | −19.4947 | 0.7547 | 1.535/55.78 | 19.7572 |
| S2 | Aspheric Surface | 7.3397 | 1.1593 | | −68.1910 |
| S3 | Spherical Surface | −118.0345 | 1.5990 | 1.755/52.32 | |
| S4 | Spherical Surface | −5.4357 | 0.0843 | | |
| STO | Spherical Surface | Infinite | 0.0798 | | |
| S5 | Aspheric Surface | 7.1867 | 1.2857 | 1.535/55.78 | −99.9900 |
| S6 | Aspheric Surface | −4.0294 | 0.1954 | | 5.2185 |
| S7 | Aspheric Surface | 9.8467 | 0.4000 | 1.640/23.53 | 38.2929 |
| S8 | Aspheric Surface | 3.9873 | 0.4434 | | −17.1518 |
| S9 | Aspheric Surface | −5.9512 | 1.2816 | 1.535/55.78 | 0.0000 |
| S10 | Aspheric Surface | −2.2910 | 0.2000 | | 0.0000 |
| S11 | Aspheric Surface | 7.3191 | 1.5561 | 1.640/23.53 | −85.1872 |
| S12 | Aspheric Surface | 2.1404 | 0.4705 | | −4.5421 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 32

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | 2.6622E−02 | −4.3597E−02 | 2.7280E−02 | −1.0684E−02 | −9.5643E−04 | 0.0000E+00 | 0.0000E+00 |
| S6 | −6.1696E−02 | 6.4349E−03 | 1.6609E−02 | −1.1033E−02 | 1.8165E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−03 | −1.6351E−02 | 2.6111E−02 | −1.5810E−02 | 5.1536E−03 | −9.0947E−04 | 6.8600E−05 |
| S9 | 1.1567E−02 | −2.7163E−03 | 2.2882E−03 | −3.5751E−04 | 0.0000E+00 | 0.0000E+00 | 0.0000E+00 |
| S10 | 1.2066E−03 | 7.7875E−03 | −4.9495E−04 | 5.1645E−05 | 1.2003E−05 | 0.0000E+00 | 0.0000E+00 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 33

| | | | |
|---|---|---|---|
| f1 (mm) | −9.84 | f (mm) | 3.68 |
| f2 (mm) | 7.48 | Fno | 2.42 |
| f3 (mm) | 5.01 | TTL (mm) | 10.31 |
| f4 (mm) | −10.68 | | |
| f5 (mm) | 6.18 | | |
| f6 (mm) | −5.32 | | |

Embodiment 12

Referring to FIG. 56 to FIG. 60, in embodiment 12, the camera lens satisfies following conditions shown in following tables:

TABLE 34

| Surface Number | Surface Type | Radius of Curvature | Thickness | Material | Conic Coefficient |
|---|---|---|---|---|---|
| OBJ | Spherical Surface | Infinite | 0.0000 | | |
| S1 | Aspheric Surface | −14.0530 | 0.7012 | 1.535/55.78 | −44.0543 |
| S2 | Aspheric Surface | 8.4649 | 1.2137 | | −99.9900 |
| S3 | Spherical Surface | 39.1162 | 1.5353 | 1.755/52.32 | |
| S4 | Spherical Surface | −7.9954 | 0.0450 | | |
| STO | Spherical Surface | Infinite | 0.0150 | | |
| S5 | Aspheric Surface | 5.3901 | 1.1183 | 1.535/55.78 | −52.7554 |
| S6 | Aspheric Surface | −3.2485 | 0.1512 | | 4.0354 |
| S7 | Aspheric Surface | 24.3952 | 0.4000 | 1.640/23.53 | 50.0000 |
| S8 | Aspheric Surface | 2.9419 | 0.4614 | | −9.9824 |
| S9 | Aspheric Surface | −13.3963 | 1.1504 | 1.535/55.78 | 0.0000 |
| S10 | Aspheric Surface | −2.2256 | 0.4442 | | 0.0000 |
| S11 | Aspheric Surface | 5.5334 | 1.3812 | 1.640/23.53 | −49.7443 |
| S12 | Aspheric Surface | 1.9689 | 0.4774 | | −4.8660 |
| S13 | Spherical Surface | Infinite | 0.2100 | 1.517/64.17 | |
| S14 | Spherical Surface | Infinite | 0.5900 | | |
| S15 | Spherical Surface | Infinite | | | |

TABLE 35

| Surface Number | A4 | A6 | A8 | A10 | A12 | A14 | A16 |
|---|---|---|---|---|---|---|---|
| S1 | 2.8192E−02 | −3.7512E−03 | 2.2374E−04 | 5.3310E−05 | −1.4922E−05 | 1.1671E−06 | −2.7364E−08 |
| S2 | 6.5792E−02 | −1.5910E−02 | 1.2638E−02 | −8.0443E−03 | 3.3960E−03 | −7.6182E−04 | 6.4887E−05 |
| S5 | 3.6210E−02 | −4.7548E−02 | 2.6865E−02 | −1.3396E−02 | −9.5643E−04 | 0.0000E+00 | 0.0000E+00 |
| S6 | −3.7335E−02 | 5.7315E−04 | 1.5176E−02 | −1.0951E−02 | 1.8165E−03 | 0.0000E+00 | 0.0000E+00 |
| S7 | −9.9361E−02 | 5.8547E−03 | 2.8284E−02 | −1.7551E−02 | 2.0642E−03 | 1.0862E−03 | −2.9232E−04 |
| S8 | −3.2031E−03 | −1.6351E−02 | 2.6111E−02 | −1.5810E−02 | 5.1536E−03 | −9.0947E−04 | 6.8600E−05 |
| S9 | 1.7184E−02 | −4.5756E−03 | 1.4903E−03 | −2.2598E−04 | 0.0000E+00 | 0.0000E+00 | 0.0000E+00 |
| S10 | 1.5258E−03 | 7.3251E−03 | −4.4901E−04 | 4.5659E−05 | 1.2003E−05 | 0.0000E+00 | 0.0000E+00 |
| S11 | −3.0441E−02 | −1.3805E−03 | 3.3400E−03 | −1.2277E−03 | 2.0976E−04 | −1.7070E−05 | 5.3359E−07 |
| S12 | −2.7888E−02 | 6.2645E−03 | −1.0292E−03 | 1.0897E−04 | −7.4593E−06 | 2.9832E−07 | −5.2726E−09 |

TABLE 36

| | | | |
|---|---|---|---|
| f1 (mm) | −9.73 | f (mm) | 3.59 |
| f2 (mm) | 8.89 | Fno | 2.41 |
| f3 (mm) | 3.95 | TTL (mm) | 9.89 |
| f4 (mm) | −5.23 | | |
| f5 (mm) | 4.80 | | |
| f6 (mm) | −5.59 | | |

In embodiments 1-12, each conditional expression satisfies conditions shown in a following table.

| Relation/ Embodiment | f2/f4 | f2/f | CT1/ CT2 | SAG11/ TTL | SAG12/ TTL | DT11/ DT62 | DT11/ DT52 | ImgH/f |
|---|---|---|---|---|---|---|---|---|
| 1 | −0.884 | 2.270 | 0.531 | 0.037 | 0.062 | 0.762 | 1.200 | 1.115 |
| 2 | −0.882 | 2.208 | 0.530 | 0.039 | 0.071 | 0.749 | 1.201 | 1.026 |
| 3 | −0.941 | 2.468 | 0.537 | 0.041 | 0.077 | 0.771 | 1.237 | 1.079 |
| 4 | −0.843 | 2.208 | 0.530 | 0.037 | 0.072 | 0.840 | 1.240 | 1.077 |

-continued

| Relation/Embodiment | f2/f4 | f2/f | CT1/CT2 | SAG11/TTL | SAG12/TTL | DT11/DT62 | DT11/DT52 | ImgH/f |
|---|---|---|---|---|---|---|---|---|
| 5 | −0.772 | 2.406 | 0.558 | 0.036 | 0.067 | 0.812 | 1.201 | 1.092 |
| 6 | −1.166 | 2.349 | 0.486 | 0.066 | 0.099 | 0.783 | 1.387 | 1.224 |
| 7 | −1.401 | 2.365 | 0.530 | 0.051 | 0.082 | 0.817 | 1.387 | 1.095 |
| 8 | −0.972 | 1.390 | 0.360 | 0.042 | 0.080 | 0.817 | 1.369 | 1.097 |
| 9 | −1.329 | 2.844 | 0.323 | 0.068 | 0.099 | 0.814 | 1.390 | 1.265 |
| 10 | −1.192 | 2.466 | 0.899 | 0.032 | 0.046 | 0.738 | 1.267 | 1.125 |
| 11 | −0.700 | 2.030 | 0.472 | 0.036 | 0.071 | 0.760 | 1.319 | 1.093 |
| 12 | −1.700 | 2.474 | 0.457 | 0.038 | 0.070 | 0.752 | 1.350 | 1.121 |

In the camera lens according to embodiments of the present disclosure, since the first lens L1 has the positive refractive power, the field angle of the camera lens may be effectively increased and the edge of the imaging surface S15 is ensured to have the sufficient luminance, thereby facilitating the wide angle of the camera lens. Moreover, as shown in the above tables and FIGS. 1-45, satisfying the various conditional expressions above allows the refractive power of the camera lens to be allocated reasonably, so that the camera lens may effectively correct various optical aberrations, and thus the camera lens has a relatively high imaging quality while providing a relatively large field angle and being miniaturized. The material of the second lens L2 is glass, which may eliminate the thermal aberration and allow the camera lens to be applied at different environmental temperatures.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A camera lens, in sequence from an object side to an image side, comprising:
   a first lens having a negative refractive power;
   a second lens having a positive refractive power, an image-side surface of the second lens being configured as a convex surface and material of the second lens being glass;
   a third lens having a positive refractive power, an image-side surface of the third lens being configured as a convex surface;
   a fourth lens having a negative refractive power;
   a fifth lens having a positive refractive power; and
   a sixth lens having a negative refractive power, an object-side surface of the sixth lens being configured as a convex surface and an image-side surface of the sixth lens being configured as a concave surface,
   wherein the camera lens satisfies following conditional expressions:

$3.18 \text{ mm} < f < 3.68 \text{ mm}$, $4.62 \text{ mm} < f2 < 9.05 \text{ mm}$, $-10.68 \text{ mm} < f4 < -4.75 \text{ mm}$, $-1.7 < f2/f4 < -0.7$, in which f denotes an effective focal length of the camera lens, f2 denotes an effective focal length of the second lens; f4 denotes an effective focal length of the fourth lens.

2. The camera lens according to claim 1, wherein the camera lens satisfies a conditional expression: $1 < f2/f < 3$, in which f2 denotes the effective focal length of the second lens.

3. The camera lens according to claim 1, wherein the camera lens satisfies a conditional expression:

$0.3 < CT1/CT2 < 0.9$, in which CT1 denotes a center thickness of the first lens in an optical axis; CT2 denotes a center thickness of the second lens in the optical axis.

4. The camera lens according to claim 1, wherein the camera lens satisfies a conditional expression:

$0.03 < SAG11/TTL < 0.08$, in which SAG11 denotes an axial distance from an intersection point of an object-side surface of the first lens with an optical axis to a vertex of an effective radius of the object-side surface of the first lens; TTL denotes an axial distance from the object-side surface of the first lens to an imaging surface.

5. The camera lens according to claim 1, wherein the camera lens satisfies a conditional expression:

$0.05 < SAG12/TTL < 0.1$, in which SAG12 denotes an axial distance from an intersection point of an image-side surface of the first lens with an optical axis to a vertex of an effective radius of the image-side surface of the first lens; TTL denotes an axial distance from an object-side surface of the first lens to an imaging surface.

6. The camera lens according to claim 1, wherein an image-side surface of the fifth lens is configured as a convex surface.

7. The camera lens according to claim 1, wherein the camera lens satisfies a conditional expression:

$0.5 < DT11/DT62 < 1$, in which DT11 denotes an effective radius of an object-side surface of the first lens; DT62 denotes an effective radius of the image-side of the sixth lens.

8. The camera lens according to claim 1, wherein the camera lens satisfies a conditional expression:

$1.1 < DT11/DT52 < 1.5$, in which DT11 denotes an effective radius of an object-side surface of the first lens; DT52 denotes an effective radius of an image-side surface of the fifth lens.

9. The camera lens according to claim 1, wherein the camera lens satisfies a conditional expression: $1 < ImgH/f < 1.5$, in which ImgH denotes a half of a diagonal line of an effective pixel area in an imaging surface of the camera lens.

10. The camera lens according to claim 1, wherein an image-side surface of the first lens is configured as a concave surface.

* * * * *